US012597692B2

(12) United States Patent
Xiao et al.

(10) Patent No.: US 12,597,692 B2
(45) Date of Patent: Apr. 7, 2026

(54) ANTENNA SYSTEM, COMMUNICATION DEVICE, AND COMMUNICATION SYSTEM

(71) Applicant: HUAWEI TECHNOLOGIES CO., LTD., Shenzhen (CN)

(72) Inventors: Weihong Xiao, Dongguan (CN); Dingjiu Daojian, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 18/884,287

(22) Filed: Sep. 13, 2024

(65) Prior Publication Data

US 2025/0007143 A1 Jan. 2, 2025

Related U.S. Application Data

(63) Continuation of application No. PCT/CN2023/080774, filed on Mar. 10, 2023.

(30) Foreign Application Priority Data

Mar. 14, 2022 (CN) .......................... 202210250065.6

(51) Int. Cl.
*H01Q 1/00* (2006.01)
*F03D 9/11* (2016.01)
(Continued)

(52) U.S. Cl.
CPC .............. *H01Q 1/005* (2013.01); *F03D 9/11* (2016.05); *F03D 9/25* (2016.05); *F03D 9/43* (2016.05);
(Continued)

(58) Field of Classification Search
CPC ........ H01Q 1/005; H01Q 19/17; H01Q 1/246; H01Q 9/10–108; F03D 9/11; F03D 9/25;
(Continued)

(56) References Cited

U.S. PATENT DOCUMENTS

| | | | | |
|---|---|---|---|---|
| 4,342,033 A | * | 7/1982 | de Camargo | .......... H01Q 15/02 |
| | | | | 343/753 |
| 4,916,459 A | * | 4/1990 | Kurosawa | .............. H01Q 15/16 |
| | | | | 343/912 |

(Continued)

FOREIGN PATENT DOCUMENTS

| | | | | |
|---|---|---|---|---|
| CN | 110048206 A | | 7/2019 | |
| CN | 113314842 A | * | 8/2021 | ............ A01M 29/16 |
| WO | 2021197081 A1 | | 10/2021 | |

*Primary Examiner* — Ab Salam Alkassim, Jr.
(74) *Attorney, Agent, or Firm* — Maier & Maier, PLLC

(57) ABSTRACT

An antenna system, a communication device, and a communication system. The antenna system includes an antenna apparatus. The antenna apparatus includes a radiating element array and a reflection plate. The radiating element array is disposed on a first side of the reflection plate. The reflection plate further has a second side opposite to the first side. The reflection plate includes a plurality of reflection plate through holes. Space on the two sides of the reflection plate is connected through the plurality of reflection plate through holes. The antenna system further includes a blade. The blade is located on one side of the antenna apparatus, and is disposed opposite to the plurality of reflection plate through holes. The solutions provided help reduce impact of wind load on the antenna system, and improve performance of the antenna system.

18 Claims, 19 Drawing Sheets

(51) Int. Cl.

| | |
|---|---|
| *F03D 9/25* | (2016.01) |
| *F03D 9/43* | (2016.01) |
| *F03D 13/20* | (2016.01) |
| *H01Q 1/24* | (2006.01) |
| *H01Q 5/42* | (2015.01) |
| *H01Q 19/10* | (2006.01) |
| *H01Q 21/06* | (2006.01) |
| *H02K 7/18* | (2006.01) |

(52) U.S. Cl.
CPC ........... *F03D 13/201* (2023.08); *H01Q 1/246* (2013.01); *H01Q 5/42* (2015.01); *H01Q 19/10* (2013.01); *H01Q 19/108* (2013.01); *H01Q 21/061* (2013.01); *H02K 7/183* (2013.01); *F05B 2220/706* (2013.01); *F05B 2240/911* (2013.01)

(58) Field of Classification Search
CPC ........ F03D 9/43; F03D 13/201; H02K 7/183; F05B 2220/706; F05B 2240/911
See application file for complete search history.

(56) References Cited

U.S. PATENT DOCUMENTS

| | | | | |
|---|---|---|---|---|
| 5,774,088 | A * | 6/1998 | Kreithen ............. | A01M 31/002 |
| | | | | 342/22 |
| 6,088,002 | A | 7/2000 | Johnson et al. | |
| 7,138,961 | B2 * | 11/2006 | Sievert .................... | F03D 80/00 |
| | | | | 343/890 |
| 9,128,184 | B1 * | 9/2015 | Bachmann ................ | G01S 7/02 |
| 10,170,831 | B2 * | 1/2019 | Bowers ................. | H01Q 21/29 |
| 2004/0232703 | A1 * | 11/2004 | Michael ................... | F03D 9/25 |
| | | | | 290/44 |
| 2006/0033674 | A1 * | 2/2006 | Essig .................... | F24S 23/715 |
| | | | | 343/915 |
| 2010/0266412 | A1 | 10/2010 | Barber | |
| 2016/0248151 | A1 | 8/2016 | Proshold et al. | |
| 2017/0062923 | A1 * | 3/2017 | Bowers .................... | H01Q 3/18 |
| 2022/0178350 | A1 * | 6/2022 | Nagel .................... | G01S 13/88 |
| 2025/0007150 | A1 * | 1/2025 | Xiao ........................ | F03D 1/06 |
| 2025/0007184 | A1 * | 1/2025 | Xiao ................... | H01Q 1/1242 |
| 2025/0309528 | A1 * | 10/2025 | Lv .......................... | H01Q 21/06 |

* cited by examiner

131

ANTENNA SYSTEM, COMMUNICATION DEVICE, AND COMMUNICATION SYSTEM

CROSS-REFERENCE TO RELATED APPLICATIONS

This application is a continuation of International Application No. PCT/CN2023/080774, filed on Mar. 10, 2023, which claims priority to Chinese Patent Application No. 202210250065.6, filed on Mar. 14, 2022. The disclosures of the aforementioned applications are hereby incorporated by reference in their entireties.

TECHNICAL FIELD

Embodiments relate to the antenna field and the communication field, and to an antenna system, a communication device, and a communication system.

BACKGROUND

A large diameter of an antenna system helps improve a gain of the antenna system, improve beam coverage, and improve a network system capacity. However, a larger diameter of the antenna system indicates larger wind load that the antenna system bears. In this case, stability of the antenna system is reduced. In addition, a pole on which the antenna system is located may be incapable of providing reliable enough support for the antenna system. Therefore, the diameter of the antenna system is limited by impact of the wind load. As a result, antenna performance cannot be effectively improved.

SUMMARY

Embodiments provide an antenna system, a communication device, and a communication system, to reduce impact of wind load on the antenna system, and improve performance of the antenna system.

According to a first aspect, an antenna system is provided, including:

a first antenna apparatus, where the first antenna apparatus includes a first radiating element array and a first reflection plate, the first radiating element array is disposed on a first side of the first reflection plate, the first reflection plate includes a plurality of first reflection plate through holes, the first reflection plate further has a second side opposite to the first side, and the first side of the first reflection plate and the second side of the first reflection plate are connected through the plurality of first reflection plate through holes; and a blade, where the blade is located on one side of the first antenna apparatus, and the blade is disposed opposite to the plurality of first reflection plate through holes.

That the blade is disposed opposite to the plurality of first reflection plate through holes may mean that one end that is of the blade and that is farthest from a rotation axis is movable around the rotation axis, and a movement trajectory of the end may form a closed pattern. The blade is disposed opposite to the plurality of reflection plate through holes. For example, the plurality of reflection plate through holes may be projected along a direction of the rotation axis of the blade to obtain a projection, and the projection may largely overlap the closed pattern. For example, the projection is located in the closed pattern. For another example, the closed pattern is located in the projection. For another example, the closed pattern and the projection cross each other, and a percentage of a crossing region of the closed pattern and the projection in the closed pattern or the projection is greater than 50%.

In this embodiment, the blade is disposed near the antenna apparatus, and the blade can rotate under an action of wind force, to provide acting force opposite to environmental wind force. This helps reduce a wind speed in an environment around, and helps reduce wind load. After the blade rotates, an airflow direction around may be further changed. This helps reduce wind force perpendicular to the reflection plate, and helps reduce impact of the wind load on the antenna system. Therefore, the solution provided in this embodiment helps reduce a possibility of damage to the antenna system due to excessively large wind load, so that the antenna apparatus can still work normally in a harsh wind environment. This helps increase a diameter of the antenna system, and improve use performance of the antenna apparatus.

With reference to the first aspect, in some implementations of the first aspect, the antenna system further includes:

a generator, where the generator is configured to collect energy generated by rotation of the blade.

In this embodiment, wind energy may be further converted into electric energy by the generator and the blade, and the electric energy obtained through conversion may be used to supply power to the antenna system or another device, to help improve environmental friendliness of the antenna system.

With reference to the first aspect, in some implementations of the first aspect, the antenna system further includes:

an energy storage apparatus, where the energy storage apparatus is configured to store the electric energy generated by the generator.

In this embodiment, the energy storage apparatus can store excess energy, to reduce an energy waste.

With reference to the first aspect, in some implementations of the first aspect, the first antenna apparatus further includes:

a first feeder, where the first feeder is disposed on the first reflection plate, and the first feeder is configured to feed the first radiating element array; and a second radiating element array and a second feeder, where the second feeder is disposed on the first reflection plate, and the second feeder is configured to feed the second radiating element array.

The first radiating element array is adjacent to the second radiating element array, first interval space exists between the second feeder and the first feeder, and a projection of at least a part of the plurality of first reflection plate through holes is located in the first interval space.

In this embodiment, the reflection plate through hole on the reflection plate may be located between two adjacent feeders, so that a region other than the reflection plate through hole on the reflection plate reflects an external signal for the feeder.

With reference to the first aspect, in some implementations of the first aspect, the first reflection plate includes M reflection row strips and N reflection column strips, the M reflection row strips and the N reflection column strips cross each other to form the plurality of first reflection plate through holes, and M and N are integers greater than 2; and projections of the first feeder and the second feeder on the first reflection plate are located on two adjacent reflection row strips in the M reflection row strips; or projections of the first feeder and the second feeder on the first reflection plate are located on two adjacent reflection column strips in the N reflection column strips.

In this embodiment, two adjacent feeders are disposed on two adjacent reflection strips, to help increase a quantity of feeders accommodated on the reflection plate.

With reference to the first aspect, in some implementations of the first aspect, a maximum radiation direction of the first radiating element array is different from a maximum radiation direction of the second radiating element array.

In this embodiment, a plurality of radiating element arrays with different maximum radiation directions are disposed on the antenna apparatus, so that the antenna apparatus can cover a wide beam range, and radio frequency performance of the antenna apparatus is improved.

In some embodiments, a working frequency of the second radiating element array is the same as or different from a working frequency of the first radiating element array.

With reference to the first aspect, in some implementations of the first aspect, the maximum radiation direction of the first radiating element array is the same as the direction of the rotation axis of the blade.

In this embodiment, airflow parallel to the rotation axis of the blade is easily interfered by the rotation of the blade. The maximum radiation direction of the radiating element array is opposite to the rotation axis of the blade, so that radio frequency energy of the radiating element array in the maximum radiation direction is high.

With reference to the first aspect, in some implementations of the first aspect, the second feeder and the first feeder are located on a same side of the first reflection plate.

In this embodiment, the second feeder and the first feeder may share the first reflection plate, to help improve integration of the antenna system.

With reference to the first aspect, in some implementations of the first aspect, the antenna system further includes:
 a second antenna apparatus, where the second antenna apparatus includes a third radiating element array and a second reflection plate, the third radiating element array is disposed on a first side of the second reflection plate, the second reflection plate includes a plurality of second reflection plate through holes, the plurality of second reflection plate through holes are disposed opposite to the blade, the second reflection plate further has a second side opposite to the first side of the second reflection plate, and the first side of the second reflection plate and the second side of the second reflection plate are connected through the plurality of second reflection plate through holes.

The second antenna apparatus is located on one side that is of the blade and that is away from the first antenna apparatus.

In this embodiment, the antenna apparatus may be disposed on two sides of the blade. The blade may provide wind load interference for a plurality of antenna apparatuses. There are blades spaced between the plurality of antenna apparatuses. Isolation between the plurality of antenna apparatuses can easily meet a radio frequency requirement.

With reference to the first aspect, in some implementations of the first aspect, the third radiating element array is located on one side that is of the second reflection plate and that is away from the blade.

In this embodiment, a distance between the third radiating element array and the first radiating element array is long, to help optimize isolation between the third radiating element array and the first radiating element array.

With reference to the first aspect, in some implementations of the first aspect, projections of the plurality of second reflection plate through holes on the first reflection plate at least partially overlap the plurality of first reflection plate through holes.

In this embodiment, the plurality of second reflection plate through holes are disposed opposite to the plurality of first reflection plate through holes. Airflow passing through the first reflection plate through hole can easily pass through the second reflection plate through hole, and airflow passing through the second reflection plate through hole can easily pass through the first reflection plate through hole. This helps reduce acting force of the airflow on the first reflection plate and the second reflection plate.

With reference to the first aspect, in some implementations of the first aspect, a maximum radiation direction of the third radiating element array is different from the maximum radiation direction of the first radiating element array.

In this embodiment, maximum radiation directions of the plurality of antenna apparatuses are different, so that the antenna apparatus can cover a wide beam range, and radio frequency performance of the antenna apparatus is improved.

In some embodiments, a working frequency of the third radiating element array is the same as or different from the working frequency of the first radiating element array.

With reference to the first aspect, in some implementations of the first aspect, the antenna system further includes:
 a fastening apparatus, where the fastening apparatus includes a stator and a rotor, the stator is fastened to the first antenna apparatus, the rotor is connected to the blade, and the rotor is rotatable relative to the stator.

In this embodiment, the blade and the antenna apparatus may be connected through the fastening apparatus, so that the antenna apparatus and the blade are disposed on a pole, and the rotation of the blade is independent of the antenna apparatus.

With reference to the first aspect, in some implementations of the first aspect, the stator includes a hollow cavity, the antenna system further includes a signal cable of the first radiating element array, and the signal cable is accommodated in the hollow cavity.

In this embodiment, the fastening apparatus has the hollow cavity that accommodates the signal cable. This helps improve cabling simplicity and further helps reduce interference of an external environment on the signal cable.

According to a second aspect, a communication device is provided, including the antenna system according to any one of the implementations of the first aspect.

According to a third aspect, a communication system is provided, including:
 the antenna system according to any one of the implementations of the first aspect;
 a signal processing apparatus, where the signal processing apparatus is configured to receive and/or send a signal through the antenna system; and
 a pole, where the antenna system is disposed on the pole.

In this embodiment, the antenna system is disposed on the pole, to help improve signal receiving and/or sending performance of the antenna system.

With reference to the third aspect, in some implementations of the third aspect, the communication system further includes:
 an energy management apparatus, where the energy management apparatus is configured to manage energy obtained by rotation of a blade.

In this embodiment, the energy management apparatus is disposed, and the energy obtained by the rotation of the blade can be recovered. This further helps properly use the recovered energy, and improves utilization of the recovered energy.

DETAILED DESCRIPTION OF EMBODIMENTS

The following describes the solutions in embodiments with reference to the accompanying drawings.

Terms used in the following embodiments are merely intended to describe specific embodiments, but are not intended as limiting. The term "and/or" is used to describe an association relationship between associated objects and represents that three relationships may exist. For example, A and/or B may represent the following cases: only A exists, both A and B exist, and only B exists, where A and B may be singular or plural. The character "/" can indicate an "or" relationship between the associated objects. Reference to "an embodiment", "some embodiments", or the like indicates that one or more embodiments include a specific feature, structure, or characteristic described with reference to embodiments. Therefore, statements such as "in an embodiment", "in some embodiments", "in some other embodiments", and "in other embodiments" that appear at different places do not necessarily mean referring to a same embodiment. Instead, the statements mean "one or more but not all of embodiments", unless otherwise specifically emphasized in another manner. A plurality of embodiments provided may be combined to obtain a new embodiment. For example, some or all features in Embodiment A and some or all features in Embodiment B may be combined to obtain a new embodiment. New embodiments obtained by combining a plurality of embodiments also fall within the scope described in the embodiments. The terms "include", "comprise", "have", and their variants all mean "include, but are not limited to", unless otherwise specifically emphasized in another manner.

Figure 1:
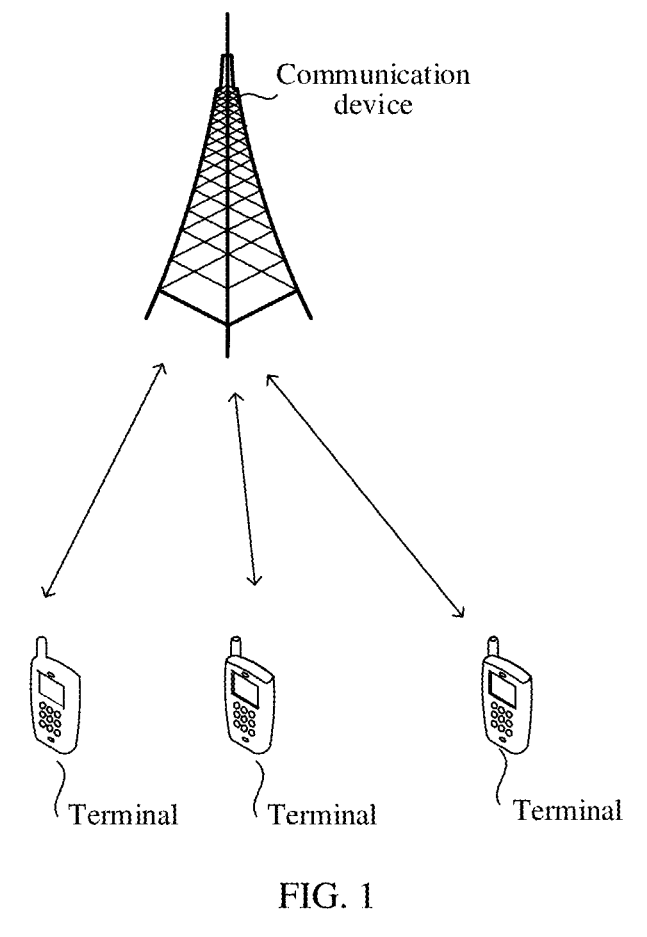
FIG. 1 is a diagram of a system architecture to which an embodiment is applicable.

FIG. 1 is a diagram of an example of a system architecture to which an embodiment is applicable. As shown in FIG. 1, the system architecture may include a communication device and a terminal. Wireless communication may be implemented between the communication device and the terminal. The communication device may also be referred to as a base station, an access network device, or the like. The communication device may be located in a base station subsystem (BSS), a terrestrial radio access network (UTRAN), or an evolved terrestrial radio access network (E-UTRAN), and is configured to perform cell coverage of a signal, to implement communication between the terminal and a wireless network. For example, the communication device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB, or eNodeB) in a long term evolution (LTE) system, or may be a radio controller in a cloud radio access network (CRAN) scenario. Alternatively, the communication device may be a relay station, an access point, a vehicle-mounted device, a wearable device, a g node (gNodeB or gNB) in a new radio (NR) system, an access network device in a future evolved network, or the like. This is not limited in embodiments.

Figure 2:
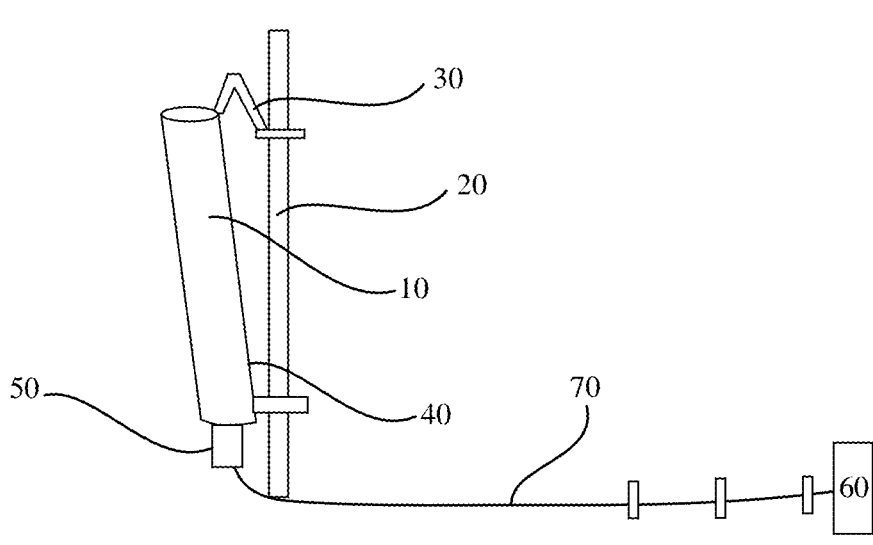
FIG. 2 is a diagram of a structure of a communication device according to an embodiment.

The communication device may be configured with an antenna system to implement signal transmission in space. FIG. 2 is a diagram of an application scenario in which the communication device shown in FIG. 1 is configured with an antenna system. The antenna system shown in FIG. 2 may include structures such as an antenna apparatus 10 and an antenna support 30. In some embodiments, for example, the antenna system may be fastened to a pole 20 of the communication device by using the antenna support 30 (in some scenarios, the pole 20 may also be referred to as a tower).

In some embodiments, the antenna system may include a radome 40, and the radome 40 covers the antenna apparatus 10. The radome 40 has a good electromagnetic wave penetration characteristic in terms of electrical performance, and can withstand impact of an external harsh environment in terms of mechanical performance, so that the antenna apparatus 10 can be protected from the impact of the external environment. For example, the radome 40 can reduce wind load (wind load, where the wind load is air flow pressure on an engineering structure, and is also referred to as wind dynamic pressure, or the like) borne by the antenna apparatus 10. In the embodiment shown in FIG. 2, the radome 40 may be mounted on the pole 20 by using the antenna support 30, so that the antenna apparatus 10 receives or transmits a signal. For example, the radome 40 may be disposed on a radiating element of the antenna apparatus 10 in a manner of electroplating, or spraying.

In the embodiment shown in FIG. 2, the communication device may further include a radio frequency processing unit 50 and a baseband processing unit 60. The baseband processing unit 60 may be connected to the antenna apparatus 10 through the radio frequency processing unit 50. In some embodiments, the radio frequency processing unit 50 may also be referred to as a radio remote unit (RRU), and the baseband processing unit 60 may also be referred to as a baseband unit (BBU). The radio frequency processing unit 50 and the baseband processing unit 60 may be connected through a transmission line 70.

It should be noted that FIG. 2 shows only an example of a position relationship between the radio frequency processing unit 50 and the antenna apparatus 10. In some other embodiments, both the radio frequency processing unit 50 and the baseband processing unit 60 may be located at a remote end of the antenna apparatus 10.

Figure 3:
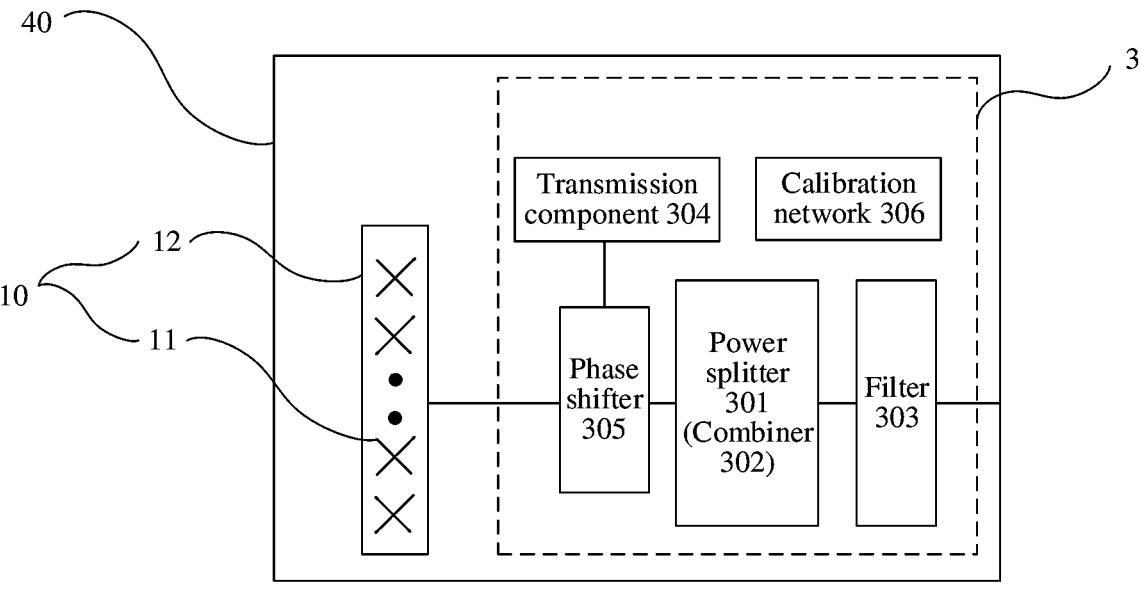
FIG. 3 is a diagram of a structure of an antenna apparatus according to an embodiment.

FIG. 3 is a diagram of a structure of an antenna apparatus 10 according to the embodiments. The antenna apparatus 10 may include a radiating element 11 and a reflection plate 12. The radiating element 11 may also be referred to as an antenna element, an element, or the like. The radiating element 11 may be a unit that constitutes a radiating element array, and can effectively radiate and/or receive an antenna signal. Frequencies of different radiating elements 11 may be the same or different. The reflection plate 12 may also be referred to as a bottom plate, an antenna panel, a metal reflection surface, or the like. The reflection plate 12 may reflect and aggregate a received signal at a reception point. The radiating element 11 can be placed on one side of the reflection plate 12. This not only can greatly enhance a signal receiving or transmitting capability, but also can block and shield an interference signal from a back surface of the reflection plate 12 (in the embodiments, the back surface of the reflection plate 12 is a side opposite to a side that is of the reflection plate 12 and that is used to dispose the radiating element 11).

In the antenna apparatus 10, a feed network 3 is located between the radiating element 11 and a power amplifier of the radio frequency processing unit 50. The feed network 3 may feed the radiating element 11, for example, provide specific power and a specific phase for the radiating element 11. For example, the feed network 3 may include a power splitter 301 (or a combiner 302) that can be used in a forward direction or in a reverse direction, and is configured to divide one signal into a plurality of signals or combine a plurality of signals into one signal. The feed network 3 may further include a filter 303, configured to filter out an interference signal. For a remote electrical tilt antenna apparatus, the feed network 3 may further include a transmission component 304 to implement different radiation beam directions, and a phase shifter 305 to change a signal radiation maximum direction. In some cases, the phase shifter 305 may further have a function of the power splitter 301 (or the combiner 302), so that the power splitter 301 (or the combiner 302) may be omitted in the feed network 3. In some embodiments, the feed network 3 may further include a calibration network 306, to obtain a required calibration signal. Different components included in the feed network 3 may be connected through a transmission line and a connector. It should be noted that the power splitter 301 (or the combiner 302) may be located inside or outside the radome 40, and a connection relationship between different components mentioned above is not unique. FIG. 3 shows only one possible position relationship and connection manner of the components.

To improve a gain of the antenna system, improve beam coverage, and improve a network system capacity, a diameter of the antenna system needs to be increased. However, if the diameter of the antenna system is excessively large, a windward area of the antenna system correspondingly increases, causing the antenna system to bear large wind load. If the antenna system bears excessively large wind load, mechanical stability of the antenna system is directly damaged. In addition, with reference to the embodiment shown in FIG. 2, the antenna system may be mounted on a top of the pole, and a bottom of the pole is fastened to the ground. When the antenna system bears large wind load, the antenna system may apply a large torque to the bottom of the pole, which may damage a fastened connection relationship between the pole and the ground, and may even cause the pole to collapse, causing a safety problem. Therefore, the diameter of the antenna system is limited by impact of the wind load. As a result, antenna performance cannot be effectively improved.

The embodiments provide a new antenna system, so that the new antenna system can have low sensitivity to the wind load. In a harsh wind environment, the antenna system may bear small wind load.

Figure 4:
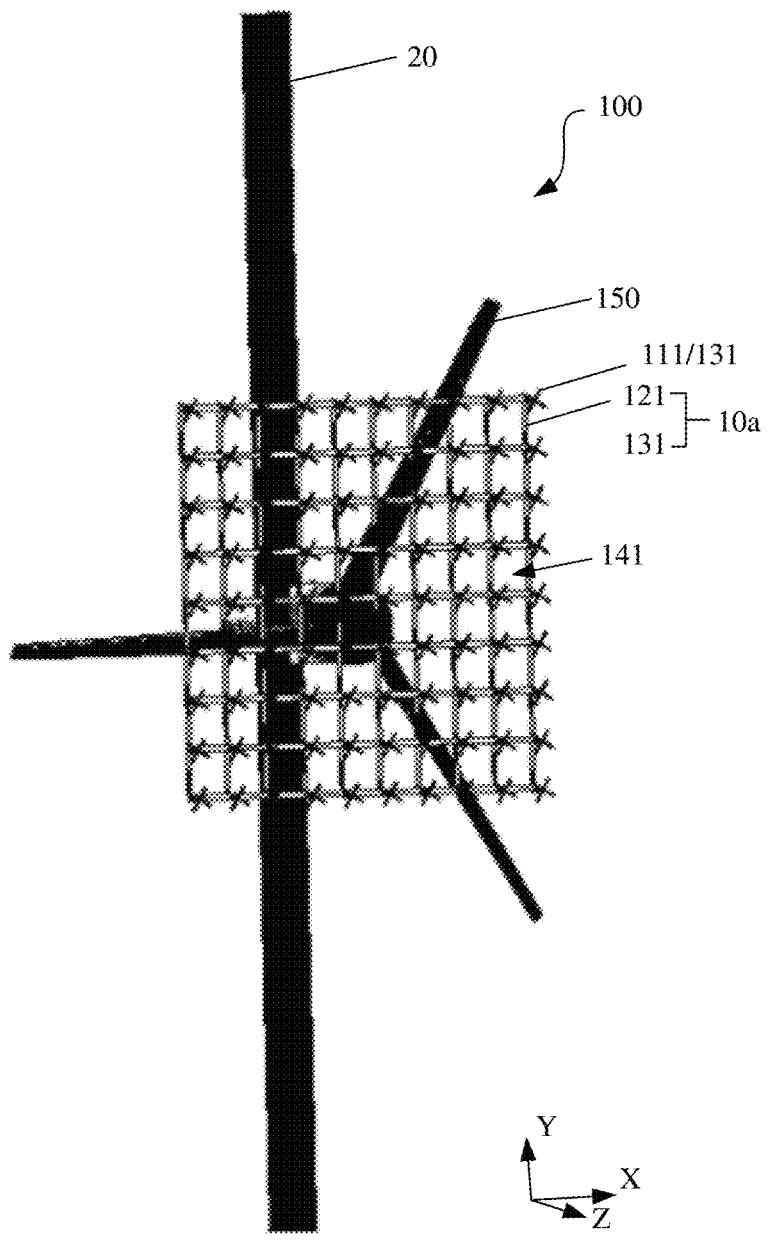
FIG. 4 is a diagram of a structure of an antenna system according to an embodiment.
Figure 5:
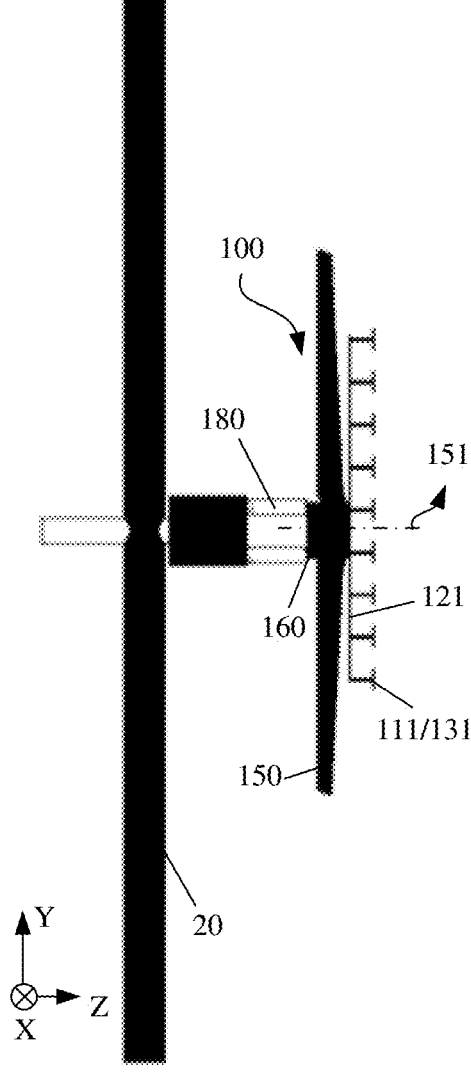
FIG. 5 is a diagram of a structure of an antenna system according to an embodiment.

FIG. 4 and FIG. 5 are diagrams of structures of an antenna system 100 according to the embodiments. In the embodiments shown in FIG. 4 and FIG. 5, the antenna system 100 may be fastened to a pole 20. For example, the pole 20 may be the pole 20 shown in FIG. 2. FIG. 4 is a diagram of a three-dimensional structure of the antenna system 100 according to an embodiment. It is assumed that an X\Y\Z coordinate system exists in space, where an X direction, a Y direction, and a Z direction may be perpendicular to each other. The antenna system 100 shown in FIG. 4 is observed along the X direction shown in FIG. 4 (the X direction may be perpendicular to the pole 20, and the pole 20 may be disposed in parallel to the Y direction), and a diagram of a structure shown in FIG. 5 may be obtained. In another possible embodiment, the antenna system 100 may not be fastened to the pole 20.

In the embodiments, parallel may include basic parallel and complete parallel. Due to reasons such as a processing error and a detection error, the complete parallel in theory may not be completely implemented. Therefore, when inclination between a direction A and a direction B is small or even negligible, the direction A and the direction B may be considered to be parallel to each other. In the embodiments, perpendicularity may include basic perpendicularity and complete perpendicularity. Due to reasons such as a processing error and a detection error, the complete perpendicularity in theory may not be completely implemented. Therefore, when an angle between a direction A and a direction B is close to or equal to 90 degrees, the direction A and the direction B may be considered to be perpendicular to each other.

The antenna system 100 may include an antenna apparatus 10a. The antenna apparatus 10a may include a radiating element array 131 and a reflection plate 121. The reflection plate 121 may have two sides, which are respectively a first side of the reflection plate 121 and a second side of the reflection plate 121. The radiating element array 131 is disposed on the first side of the reflection plate 121. The reflection plate 121 includes a plurality of reflection plate through holes 141. The reflection plate 121 further has the second side opposite to the first side of the reflection plate 121. The first side of the reflection plate 121 and the second side of the reflection plate 121 are connected through the plurality of reflection plate through holes 141. In other words, space on the two sides of the reflection plate 121 is connected through the plurality of reflection plate through holes 141. The antenna system 100 may further include a blade 150. The blade 150 is located on one side of the antenna apparatus 10a, and the blade 150 is disposed opposite to the plurality of reflection plate through holes 141.

In the embodiments, that a component A is disposed opposite to a component B may mean that the component A is projected along a target direction to obtain a projection 1, the component B is projected along the target direction to obtain a projection 2, and the projection 1 and the projection 2 may at least largely overlap. In some embodiments, largely overlapping may be any one of the following cases: The projection 1 is completely located in the projection 2; the projection 2 is completely located in the projection 1; or the projection 1 and the projection 2 cross each other, and a percentage of a crossing region of the projection 1 and the projection 2 in the projection 1 or the projection 2 is greater than 50%.

The reflection plate through hole 141 may have two openings. One opening may face the first side of the reflection plate 121, and the other opening may face the second side of the reflection plate 121. Because the space on the two sides of the reflection plate 121 is connected through the plurality of reflection plate through holes 141, when airflow blows from the first side of the reflection plate 121 to the reflection plate 121, the airflow may pass through the plurality of reflection plate through holes 141 and flow to the second side of the reflection plate 121; or when airflow blows from the second side of the reflection plate 121 to the reflection plate 121, the airflow may pass through the plurality of reflection plate through holes 141 and flow to the first side of the reflection plate 121.

In the embodiments provided, the antenna system 100 may include one or more blades 150. As shown in FIG. 4, the antenna system 100 may include three blades 150. In the embodiments, a working manner of one of the three blades 150 is used as an example for description. For working manners of remaining blades 150, reference may be correspondingly made to the one blade 150.

Figure 6:
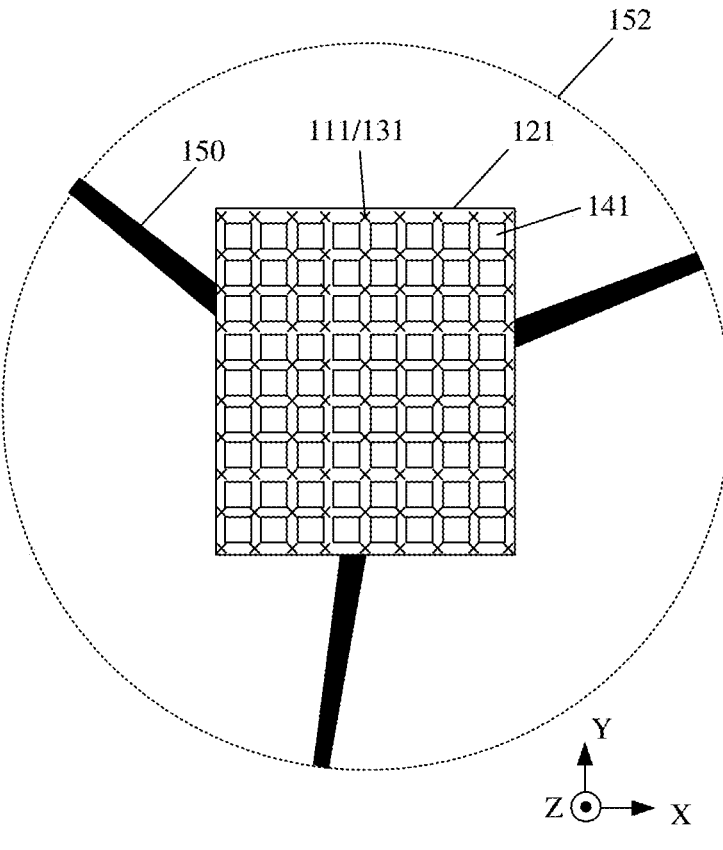
FIG. 6 is a diagram of a structure of an antenna system according to an embodiment.

The blade 150 is rotatable under an action of wind force. As shown in FIG. 5, the blade 150 is rotatable around a rotation axis 151 of the blade 150. In the embodiments shown in FIG. 4 and FIG. 5, the rotation axis 151 of the blade 150 may be parallel to the Z direction. As shown in FIG. 6, after the blade 150 rotates for one circle, a movement trajectory that is around the rotation axis 151 and that is of one end that is of the blade 150 and that is farthest from the rotation axis 151 may form a closed pattern 152. The blade 150 is disposed opposite to the plurality of reflection plate through holes 141. For example, the plurality of reflection plate through holes 141 may be projected along a direction of the rotation axis 151 of the blade 150 to obtain a projection 3, and the projection 3 may largely overlap the closed pattern 152. For example, the projection 3 is located in the closed pattern 152. For another example, the closed pattern 152 and the projection 3 cross each other, and a percentage of a crossing region of the closed pattern 152 and the projection 3 in the closed pattern 152 or the projection 3 is greater than 50%.

When the reflection plate 121 may be disposed opposite to the blade 150, the blade 150 is disposed opposite to the plurality of reflection plate through holes 141. For example, the reflection plate 121 may be projected along the direction of the rotation axis 151 of the blade 150 to obtain a projection 4, and the projection 4 may largely overlap the closed pattern 152. For example, the projection 4 is located in the closed pattern 152. For another example, the closed pattern 152 is located in the projection 4. For another example, the closed pattern 152 and the projection 4 cross each other, and a percentage of a crossing region of the closed pattern 152 and the projection 4 in the closed pattern 152 or the projection 4 is greater than 50%.

In the embodiments shown in FIG. 4 and FIG. 5, the plurality of reflection plate through holes 141 opposite to the blade 150 may be disposed as a whole close to a center of the reflection plate 121. For example, a central reflection plate through hole 141 in the plurality of reflection plate through holes 141 is disposed at the center of the reflection plate 121. In an embodiment, the rotation axis 151 of the blade 150 may be opposite to the center of the reflection plate 121. In other embodiments, the plurality of reflection plate through holes 141 opposite to the blade 150 may be disposed as a whole close to an edge of the reflection plate 121, that is, disposed away from the center of the reflection plate 121.

In the embodiments provided, a directivity diagram of the antenna system 100 is adjusted by adjusting relative arrangement of the plurality of reflection plate through holes 141 as a whole on the reflection plate 121. For example, the plurality of reflection plate through holes 141 are disposed close to an edge a of the reflection plate 121, and the edge a may be opposite to an edge b of the reflection plate 121. Therefore, the plurality of reflection plate through holes 141 are disposed as a whole away from the edge b. The reflection plate 121 may have weaker reflection performance in a region close to the edge b, and the reflection plate 121 may have stronger reflection performance in a region away from the edge b. This helps adjust the directivity diagram of the antenna system 100.

The reflection plate 121 may have both a signal reflection capability and a ventilation capability. When a high reflection capability is required, a size of the reflection plate through hole 141 may be small. When a high ventilation capability is required, the size of the reflection plate through hole 141 may be large. In some embodiments, a working frequency of the radiating element array 131 is f, where f is corresponding to a wavelength $\lambda$. A size of the reflection plate 121 may be less than or equal to $0.1\lambda$ to $0.3\lambda$, for example, less than or equal to $0.25\lambda$, $0.2\lambda$, or $0.15\lambda$. As shown in FIG. 4 and FIG. 5, the reflection plate through hole 141 may be a square through hole, and a side length of the square through hole may be $0.3\lambda$. In another embodiment, the reflection plate through hole 141 may be of a rectangle, and a length and a width of the rectangle may be adjusted based on intensity, a phase, and the like of radio frequency energy.

In the embodiments shown in FIG. 4 and FIG. 5, the radiating element array 131 may be disposed on the first side of the reflection plate 121, and the blade 150 is located on the second side of the reflection plate 121. That is, the radiating element array 131 and the blade 150 may be respectively located on the two sides of the reflection plate 121. A maximum radiation direction of the radiating element array 131 may be a direction facing away from the blade 150. In other embodiments, the blade 150 and the radiating element array 131 may be located on a same side of the reflection plate 121, and the radiating element array 131 may be located between the blade 150 and the reflection plate 121. The maximum radiation direction of the radiating element array 131 may be a direction facing the blade 150.

In the embodiment shown in FIG. 5, the antenna apparatus 10a and the blade 150 may be connected through a fastening apparatus 160. The fastening apparatus 160 may be fastened to the pole 20, so that the antenna apparatus 10a and the blade 150 may be fastened to the pole 20 through the fastening apparatus 160. For example, the fastening apparatus 160 may correspond to the antenna support 30 shown in FIG. 2.

In some embodiments, as shown in FIG. 5, the antenna system 100 may further include a generator 180. The generator 180 may be connected to the blade 150. The blade 150 rotates under the action of the wind force, to drive an actuator of the generator 180 to rotate relative to a stator of the generator 180, so that the generator 180 may be configured to collect energy generated by rotation of the blade 150. In some embodiments, the antenna system 100 may further include an energy storage apparatus. The energy storage apparatus may be electrically connected to the generator 180, so that electric energy generated by the generator 180 may be stored in the energy storage apparatus.

Figure 7:
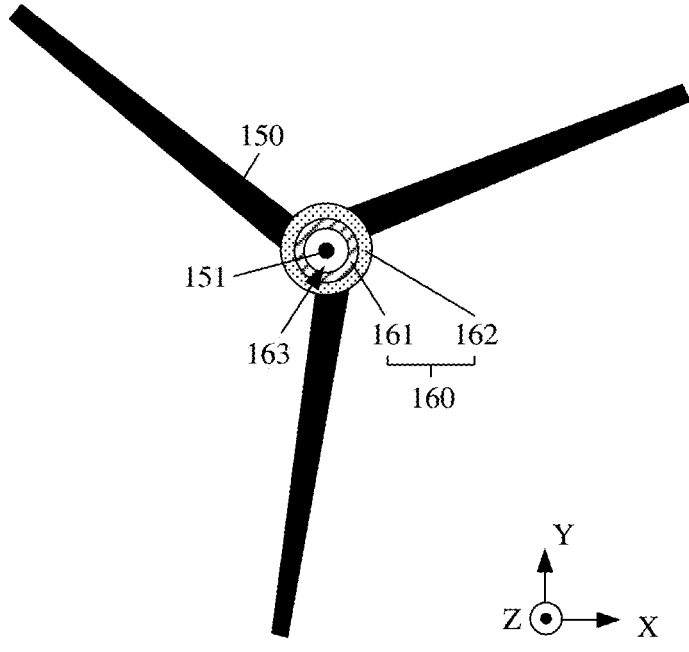
FIG. 7 is a diagram of a structure of a blade and a fastening apparatus according to an embodiment.

FIG. 7 is a diagram of a structure of a fastening apparatus 160 according to the embodiments.

The fastening apparatus 160 may include a stator 161 and a rotor 162. With reference to FIG. 4, FIG. 5, and FIG. 7, one end of the stator 161 may be fastened to the antenna apparatus 10a. Another end of the stator 161 may be fastened to the pole 20. The rotor 162 may be connected to the blade 150. For example, one end that is of the blade 150 and that is close to the rotation axis 151 may be disposed on the rotor 162. The blade 150 may rotate under the action of the wind force, so that the blade 150 may drive the rotor 162 to rotate relative to a rotating shaft of the rotor 162. The stator 161 is relatively fastened. In a possible scenario, along the direction of the rotation axis 151 of the blade 150 (for example, the Z direction shown in FIG. 7), the blade 150 may be fastened relative to the stator 161. That is, a spacing between the blade 150 and the antenna apparatus 10a may be relatively fastened.

In some embodiments, as shown in FIG. 7, the rotor 162 may be around an outer circumference of the stator 161. For example, the rotor 162 may have a rotor cavity, and the stator 161 may pass through the rotor cavity. When the rotor 162 rotates, the rotor 162 may rotate around the stator 161, and the stator 161 may be fastened relative to the pole 20 in the rotor cavity.

In a possible case, the stator 161 may include a hollow cavity 163. The hollow cavity 163 may be used to accommodate a signal cable of the antenna apparatus 10a. For example, the radiating element array 131 is fed by a feed network, and the feed network includes a feeder and a signal cable. The feeder may be disposed on one side that is of the reflection plate 121 and that is close to the radiating element array 131, or the feeder and the radiating element array 131 may be respectively disposed on the two sides of the reflection plate 121. One end of the feeder may be electrically connected to the radiating element. Another end of the feeder may be electrically connected to the signal cable. The signal cable may be accommodated in the hollow cavity 163 of the stator 161. One end of the signal cable may be electrically connected to the feeder. Another end of the signal cable may be electrically connected to a signal processing apparatus (for example, the radio frequency processing unit 50 shown in FIG. 2), or electrically connected to another module that has a signal processing capability. It should be noted that both the signal cable and the feeder may be a transmission line in the embodiment shown in FIG. 3. With reference to the embodiment shown in FIG. 3, one or more of the following in the feed network may be accommodated in the hollow cavity 163: a connector, a power splitter 301 (or a combiner 302), a filter 303, a transmission component 304, a phase shifter 305, and a calibration network 306.

In the embodiments provided, that the component A is electrically connected to the component B may mean that the component A is directly electrically connected to the component B, or the component A is indirectly electrically connected to the component B through another component.

In the embodiments provided, a specific manner of an electrical connection may include an electrical connection and an electrical coupling. The electrical connection may mean that there is a mechanical connection relationship between the component A and the component B, and the component A and the component B may transmit an electrical signal over the mechanical connection relationship between the component A and the component B. The electrical coupling may mean that although there is no mechanical connection relationship between the component A and the component B, the component A and the component B may transmit an electrical signal through short-distance interval space between the component A and the component B.

In the embodiments provided, that there is the mechanical connection relationship between the component A and the component B may mean that the component A is directly mechanically connected to the component B; or may mean that the component A is mechanically connected to the component B through another component. For example, the component A is directly mechanically connected to a component C, and the component C is directly mechanically connected to the component B. That is, the component A and the component B are indirectly mechanically connected through the component C.

In some other embodiments, the stator 161 may be around an outer circumference of the rotor 162. For example, the stator 161 may have a stator cavity, at least a part of the rotor 162 may be accommodated in the stator cavity, and the rotor 162 is rotatable relative to the stator 161 in the stator cavity.

Figure 8:
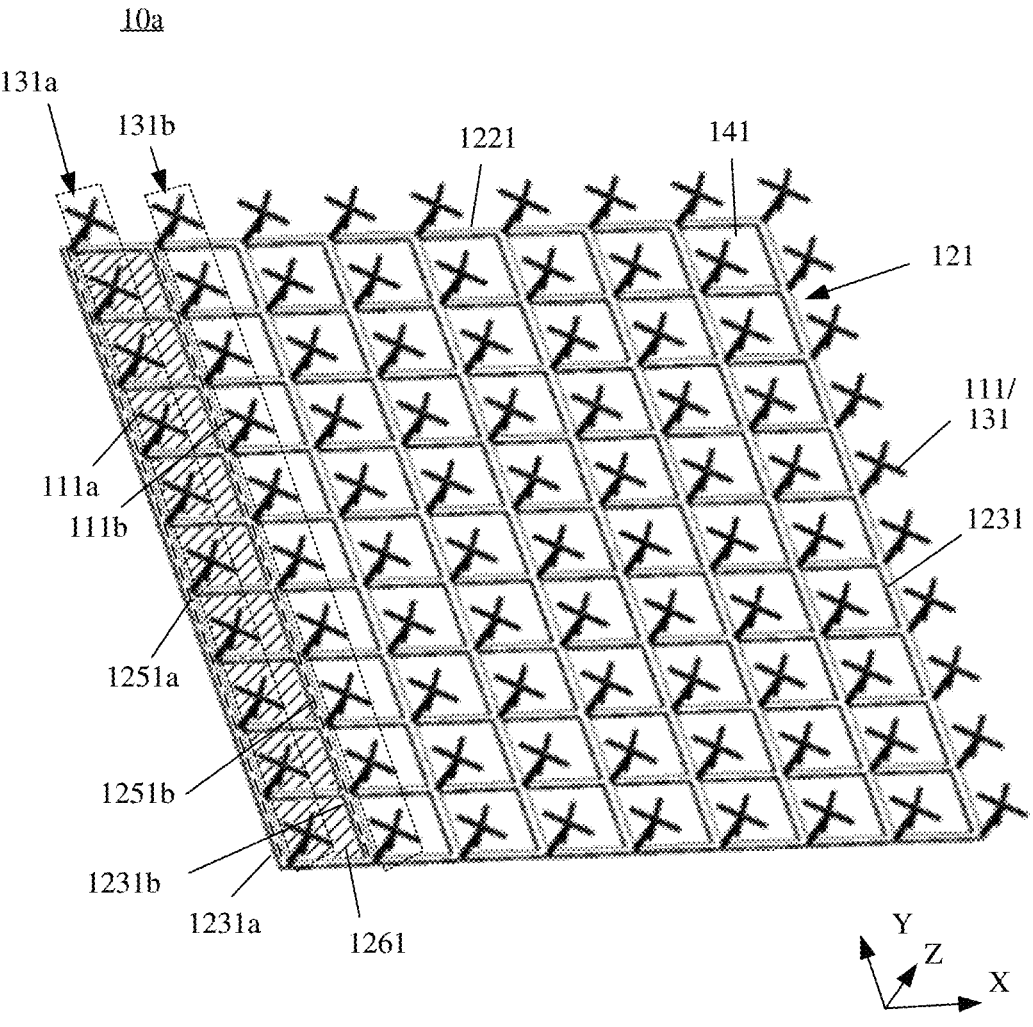
FIG. 8 is a diagram of a structure of an antenna apparatus according to an embodiment.
Figure 9:
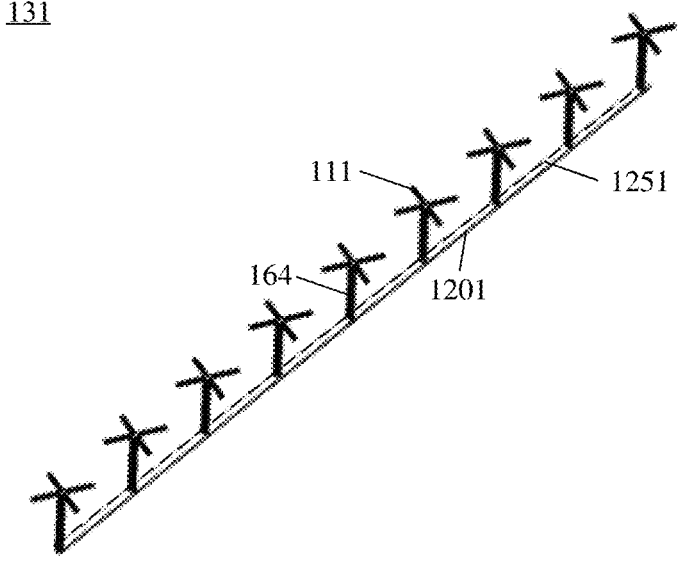
FIG. 9 is a diagram of a structure of a radiating element array according to an embodiment.

FIG. 8 is a diagram of a structure of an antenna apparatus 10a according to an embodiment. FIG. 9 is a diagram of a structure of a radiating element array 131 according to an embodiment. It should be understood that the embodiments provided are not limited to a specific quantity, a specific placement manner, and the like shown in FIG. 8 and FIG. 9.

With reference to FIG. 8 and FIG. 9, a reflection plate 121 may include a plurality of reflection strips 1201. The plurality of reflection strips 1201 may cross each other to form a plurality of reflection plate through holes 141.

In some embodiments provided, the reflection plate 121 may include M reflection row strips 1221 and N reflection column strips 1231. The M reflection row strips 1221 and the N reflection column strips 1231 may cross each other, to form the plurality of reflection plate through holes 141. In the embodiments, the reflection row strip 1221 and the reflection column strip 1231 may be two reflection strips 1201 with different extension directions. As shown in FIG. 8, the reflection plate 121 may include 10 reflection row strips 1221 and nine reflection column strips 1231. The 10 reflection row strips 1221 and the nine reflection column strips 1231 cross each other to form 72 reflection plate through holes 141. The reflection row strip 1221 may be parallel to the X direction. The reflection column strip 1231 may be parallel to the Y direction.

One or more radiating element arrays 131 may be disposed on the reflection plate 121. The radiating element array 131 may include a plurality of radiating elements 111. In some embodiments, one or more radiating element arrays 131 may be disposed on one reflection strip 1201. In some other embodiments, one radiating element array 131 may be disposed on a plurality of reflection strips 1201.

In an embodiment shown in FIG. 8, nine radiating element arrays 131 may be respectively disposed on the nine reflection column strips 1231. For example, one radiating element array 131 may be disposed on each of the reflection column strips 1231. Each radiating element array 131 may include 10 radiating elements 111. The 10 radiating elements 111 may be disposed on the reflection column strip 1231 at an equal spacing.

In another embodiment shown in FIG. 8, 18 radiating element arrays 131 may be disposed on the nine reflection column strips 1231. For example, two radiating element arrays 131 may be disposed on each of the reflection column strips 1231. Each radiating element array 131 may include five radiating elements 111. The five radiating elements 111 may be disposed on the reflection column strip 1231 at an equal spacing.

In still another embodiment shown in FIG. 8, five radiating element arrays 131 may be disposed on the 10 reflection row strips 1221. For example, one radiating element array 131 may be disposed on two reflection row strips 1221. Each radiating element array 131 may include 18 radiating elements 111. One half of the 18 radiating elements 111 may be disposed on one reflection row strip 1221, and the other half may be disposed on another reflection row strip 1221. A spacing between two adjacent radiating elements 111 may be the same.

In the embodiment shown in FIG. 9, the plurality of radiating elements 111 of the radiating element array 131 may be disposed on one reflection strip 1201 at an equal spacing. The radiating element 111 may include one or more dipoles. In the embodiment shown in FIG. 9, the radiating element 111 may include two dipoles with different polarization directions. The polarization directions of the two dipoles are perpendicular to each other. The radiating element 111 may be fastened to the reflection strip 1201 by using a support structure 164. The support structure 164 may include a conductor structure. The conductor structure is, for example, a balun structure.

A feeder 1251 is further disposed on one side that is of the reflection strip 1201 and that is close to the radiating element array 131. The feeder 1251 may be a part of a feed network a of the radiating element 111. The feed network a may be configured to feed the radiating element 111. One end of the feeder 1251 may be electrically connected to the radiating element 111. For example, another end of the feeder 1251 may be electrically connected to a signal processing apparatus (for example, the radio frequency processing unit 50 shown in FIG. 2).

The feeder 1251 may be disposed opposite to the reflection strip 1201. For example, a projection of the feeder 1251 on the reflection plate 121 may be located outside the plurality of reflection plate through holes 141. The projection of the feeder 1251 on the reflection plate 121 may be located on the reflection strip 1201 of the reflection plate 121.

In a possible case, the feeder 1251 may be grounded through the reflection strip 1201 of the reflection plate 121. An insulation member may be disposed on one side that is of the reflection strip 1201 and that is close to the feeder 1251. A part of the feeder 1251 may cross or pass through the insulation member, and is connected to the reflection strip 1201. Another part of the feeder 1251 may be disposed on one side that is of the insulation member and that is away from the reflection strip 1201. The feeder 1251 is grounded through the reflection plate 121. This helps simplify line arrangement.

In a possible case, the feeder 1251 includes a line for grounding. An insulation member may be disposed between the feeder 1251 and the reflection strip 1201. The feeder 1251 may be disposed on one side that is of the insulation member and that is away from the reflection strip 1201. The insulation member may be configured to avoid a short circuit between the feeder 1251 and the reflection strip 1201.

In the embodiments shown in FIG. 4 to FIG. 9, the maximum radiation direction (which may also be referred to as a pointing direction) of the radiating element array 131 may be the same as the direction of the rotation axis 151 of the blade 150. That is, the maximum radiation direction of the radiating element array 131 may be disposed in parallel to the rotation axis 151 of the blade 150. The maximum radiation direction of the radiating element array 131 may be related to an extension direction of the support structure 164. As shown in FIG. 9, the extension direction of the support structure 164 may be disposed in parallel to the rotation axis 151 of the blade 150.

The following uses FIG. 8 as an example to describe an embodiment of the antenna apparatus 10a provided in the embodiments.

It is assumed that a radiating element array 131a and a radiating element array 131b are disposed on the reflection plate 121, which are respectively outlined by dashed lines in the figure. The radiating element array 131a includes 10 radiating elements 111a. The 10 radiating elements 111a are disposed on a reflection column strip 1231a of the reflection plate 121 at an equal spacing. The radiating element array 131b includes 10 radiating elements 111b. The 10 radiating elements 111b are disposed on a reflection column strip 1231b of the reflection plate 121 at an equal spacing. A spacing between two adjacent radiating elements 111a may be the same as a spacing between two adjacent radiating elements 111b. A working frequency of the radiating element array 131a may be the same as a working frequency of the radiating element array 131b. Both the 10 radiating elements 111a and the 10 radiating elements 111b may be arranged in one column and 10 rows.

The radiating element array 131a may be fed by a feed network a, and the feed network a may include a feeder 1251a. The radiating element array 131b may be fed by a feed network b, and the feed network b may include a feeder 1251b. There is interval space 1261 (as shown in a slashed region in FIG. 8) between the feeder 1251a and the feeder 1251b. Among the 72 reflection plate through holes 141 on the reflection plate 121, nine reflection plate through holes 141a may be projected in the interval space 1261. In other words, the size of the reflection plate through hole 141 may be less than or equal to a distance between two adjacent radiating element arrays 13. A projection of the feeder 1251a on the reflection plate 121 may be located on the reflection column strip 1231a. A projection of the feeder 1251b on the reflection plate 121 may be located on the reflection column strip 1231b.

In some embodiments, as shown in FIG. 8, the radiating element array 131a and the radiating element array 131b may be two adjacent radiating element arrays 131. In other words, there is no other radiating element array 131 between the radiating element array 131a and the radiating element array 131b. In a possible case, the reflection column strip 1231a and the reflection column strip 1231b may be two adjacent reflection column strips 1231. In another possible case, one or more reflection column strips 1231 may be further disposed between the reflection column strip 1231*a* and the reflection column strip 1231*b*.

In other possible cases, the radiating element array 131*a* and the radiating element array 131*b* may alternatively be disposed on the reflection row strip 1221 of the reflection plate 121. The embodiment in which the radiating element array is disposed on the reflection row strip 1221 of the reflection plate 121 may be similar to the embodiment in which the radiating element array is disposed on the reflection column strip 1231 of the reflection plate 121. A person skilled in the art may refer to the embodiment shown in FIG. 8, to dispose the radiating element array 131*a* and the radiating element array 131*b* on the reflection row strip 1221 of the reflection plate 121.

In some embodiments, the radiating element array 131*a* may further include more or fewer radiating elements 111*a*.

In some embodiments, the radiating element array 131*b* may further include more or fewer radiating elements 111*b*. For example, the radiating element array 131*b* may include 20 radiating elements 111*b* that are arranged in 2 columns and 10 rows.

Figure 10:
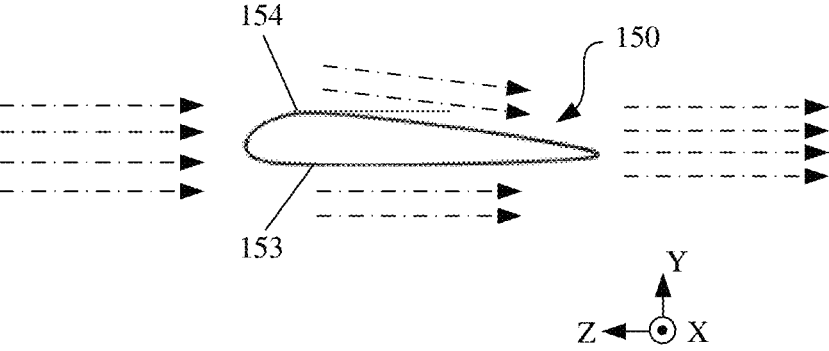
FIG. 10 is a diagram of a cross section of a blade according to an embodiment.
Figure 11:
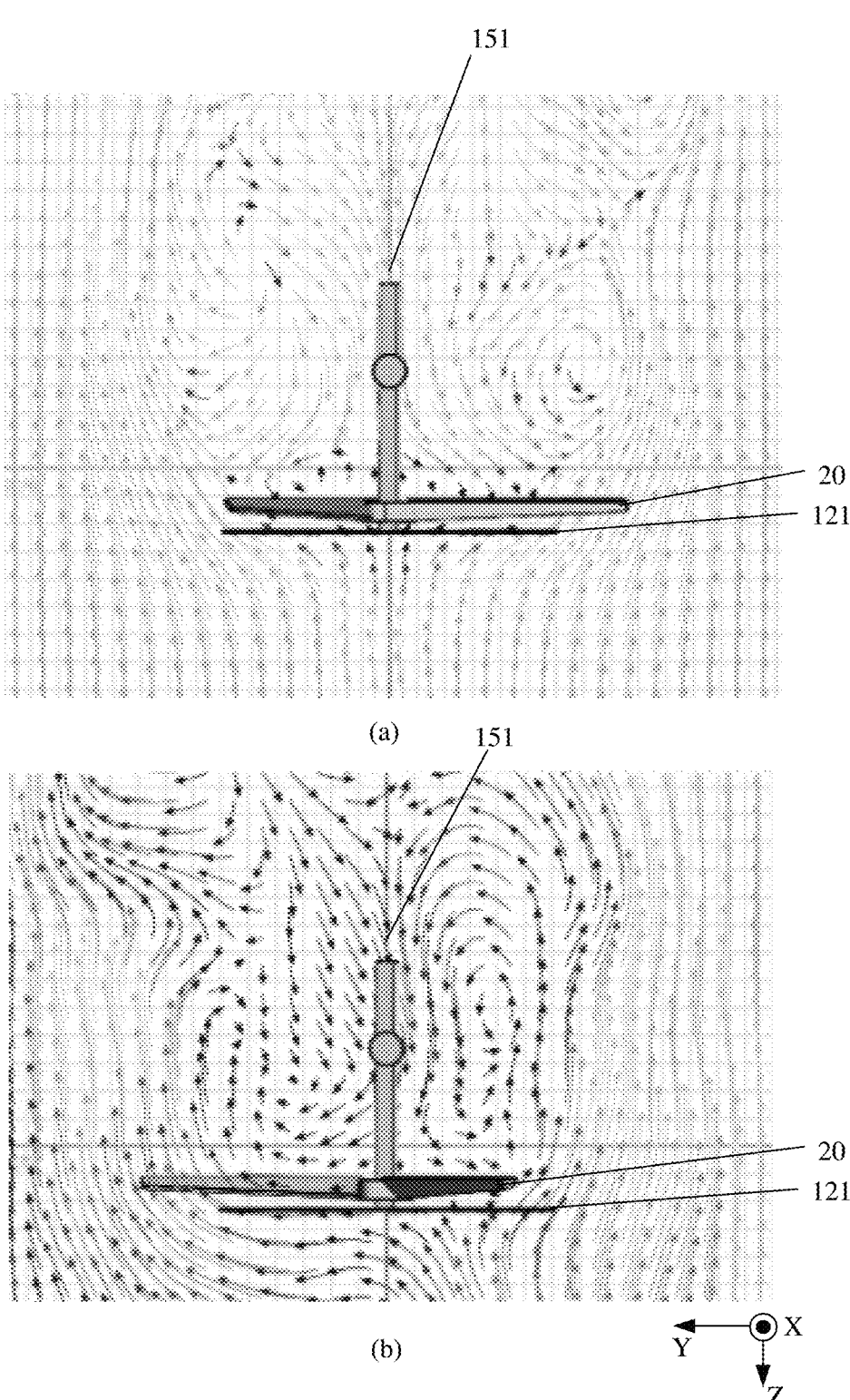
FIG. 11 is an airflow simulation diagram according to an embodiment.

With reference to FIG. 10 and FIG. 11, the following describes a rotation principle of the blade 150 and beneficial effects of the antenna system 100 according to the embodiments.

FIG. 10 shows a possible cross section of one blade 150. The blade 150 may have two opposite surfaces. A surface 153 of the blade 150 is disposed inclined to a surface 154 of the blade 150. A surface area of the surface 154 of the blade 150 may be greater than a surface area of the surface 153 of the blade 150. In some embodiments, the surface 153 of the blade 150 may be disposed in parallel to a rotation axis 151 of the blade 150 (parallel to a Z direction shown in FIG. 10). When airflow blows to the blade 150 along a direction of the rotation axis 151 of the blade 150, because the areas of the surface 154 and the surface 153 are different, the airflow may generate acting force of different magnitudes on the surface 153 and the surface 154 of the blade 150. The acting force may have a component perpendicular to the rotation axis 151 of the blade 150, so that the blade 150 is rotatable around the rotation axis 151 under an action of the airflow.

(a) in FIG. 11 shows a simulation diagram of airflow in an environment around the antenna system 100 before the blade 150 rotates. (b) in FIG. 11 shows a simulation diagram of the airflow in the environment around the antenna system 100 when the blade 150 rotates.

As shown in (a) in FIG. 11, when the airflow acts on a reflection plate 121 along the direction of the rotation axis 151 of the blade 150 (an airflow direction may tend to be parallel to the Z direction), the airflow may pass through the reflection plate 121 and further act on the blade 150. According to the principle described in FIG. 10, the blade 150 may rotate under an action of the airflow. After the blade 150 rotates, rotation of the blade 150 may change an airflow direction around the blade 150. As shown in (b) in FIG. 11, after the blade 150 rotates, an airflow direction on one side that is of the reflection plate 121 and that is away from the blade 150 tends to be relatively perpendicular to the rotation axis 151 of the blade 150, that is, tends to be relatively parallel to the reflection plate 121 (as shown in (b) in FIG. 11, the airflow direction may tend to be parallel to the Y direction). The reflection plate 121 is sensitive to acting force perpendicular to the reflection plate 121, and is insensitive to acting force parallel to the reflection plate 121. Therefore, this helps reduce sensitivity of the antenna system 100 to wind load, and reduce a possibility of damage to the antenna system 100 due to excessively large wind load.

In the embodiment shown in FIG. 11, an arrow with a light grayscale represents airflow with a large rate, and an arrow with a dark grayscale represents airflow with a small rate. That is, the blade 150 may rotate to generate wind force. The wind force may reduce a rate of airflow in an environment, that is, a wind speed may be reduced. A formula for calculating the wind load is as follows: $F_w=C_d \cdot q_v \cdot A$, where $F_w$, is the wind load (unit: N), $C_d$ is a drag coefficient (drag coefficient), $q_v$ is a wind pressure (wind pressure), and A is a windward projection area (windward projection area). The wind pressure $q_v$ may be related to air density and wind speed. The wind pressure $q_v$ may satisfy:

$$q_v = \frac{1}{2} \cdot \rho \cdot v^2,$$

where P is the air density (air density, unit: kg/m³), and v is the wind speed (wind speed, unit: m/s). It is assumed that in a short period, the drag coefficient $C_d$, the windward projection area A, and the air density P may basically remain unchanged. Because the wind speed v is reduced, the wind pressure $q_v$ may be reduced, so that the wind load $F_w$ may be reduced. Because the blade 150 can reduce wind load $F_w$ near the reflection plate 121, under a same wind load $F_w$ requirement, the antenna system 100 may have a large diameter, helping improve antenna performance of the antenna system 100.

Because the reflection plate 121 has a plurality of reflection plate through holes 141, a windward projection area of the reflection plate 121 may be slightly reduced. According to the foregoing formula, the antenna system 100 may bear small wind load in a same environment, so that the antenna system 1001 has a large diameter, and the antenna performance of the antenna system 100 is improved.

In some embodiments, observed along the direction of the rotation axis 151 of the blade 150, a distance by which the blade 150 extends out of an outer contour of the reflection plate 121 may be less than a length or a width of the reflection plate 121. In an embodiment, a ratio of the distance by which the blade 150 extends out of the outer contour of the reflection plate 121 to the length or the width of the reflection plate 121 may be greater than zero and less than or equal to ⅖. For example, the ratio is greater than or equal to ⅕ and less than or equal to ⅓, and may be ¼.

According to the embodiment shown in (b) in FIG. 11, observed along the direction of the rotation axis 151 of the blade 150, a region that is of the blade 150 and that extends out of the outer contour of the reflection plate 121 may block airflow, so that the airflow forms an airflow envelope region at one end that is of the blade 150 and that is away from the rotation axis 151. In the airflow envelope region, an airflow direction may change greatly. As shown in FIG. 11, the airflow direction may change from being approximately perpendicular to the rotation axis 151 of the blade 150 to being approximately parallel to the rotation axis 151 of the blade 150 (for example, the airflow direction changes from being parallel to the Y direction to being parallel to the Z direction). The airflow envelope region may act on the blade 150. For example, the reflection plate 121 may be located outside the airflow envelope region. This helps improve a rotation speed of the blade 150, and reduce acting force of the airflow envelope region on the reflection plate 121.

Figure 12:
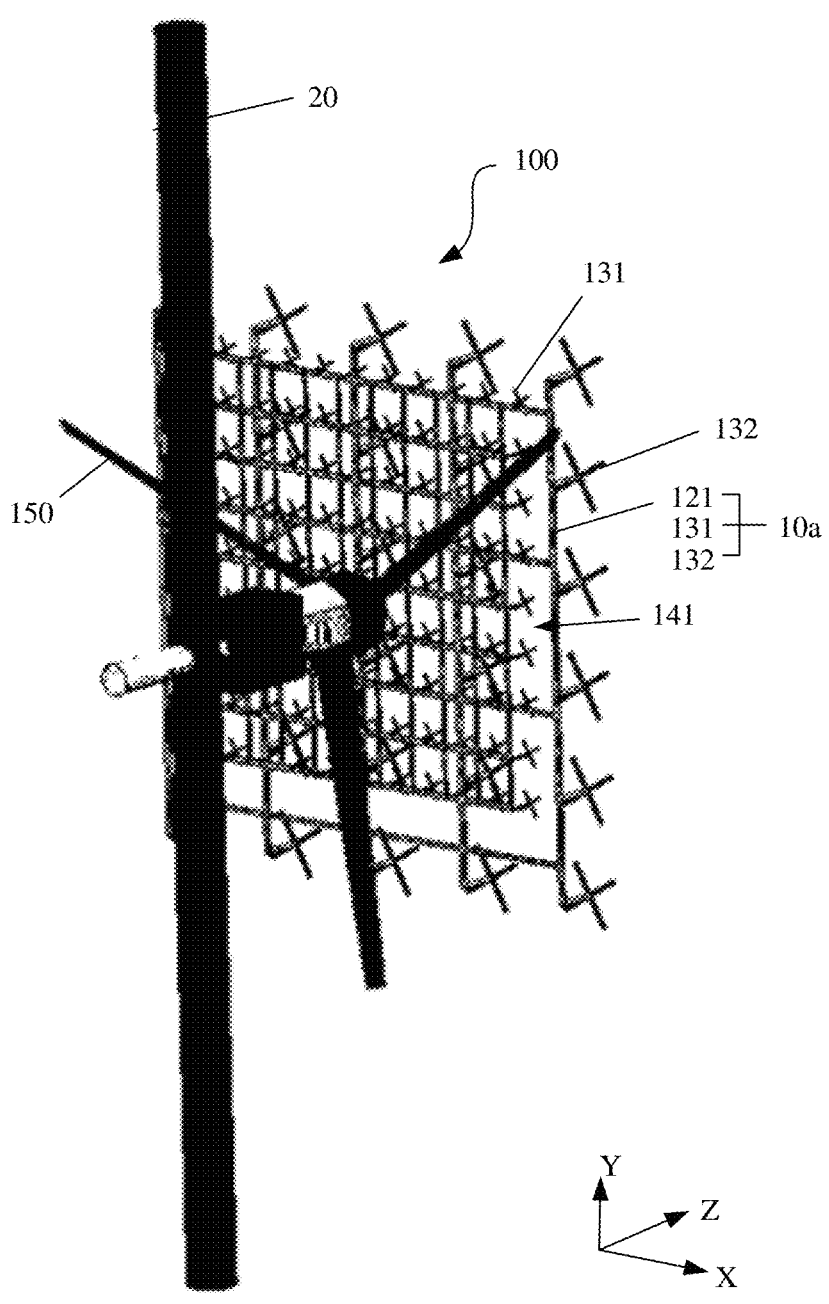
FIG. 12 is another diagram of a structure of an antenna system according to an embodiment.
Figure 13:
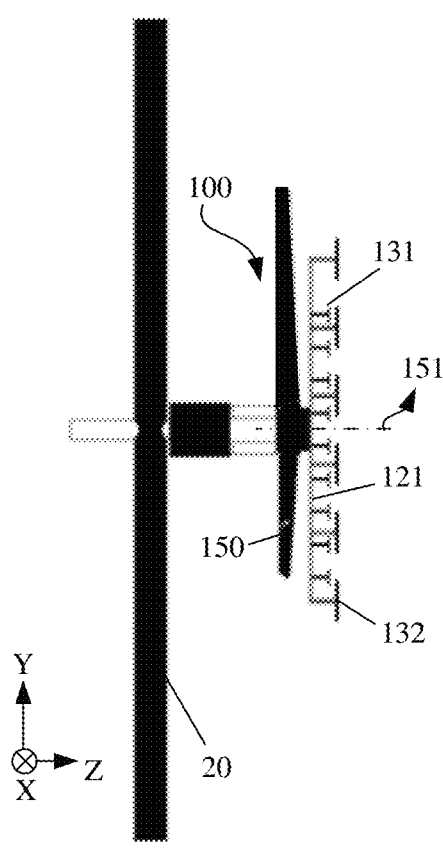
FIG. 13 is another diagram of a structure of an antenna system according to an embodiment.

FIG. 12 and FIG. 13 are other diagrams of structures of an antenna system 100 according to embodiments. FIG. 12 is a diagram of a three-dimensional structure of the antenna system 100 according to an embodiment. The antenna system 100 shown in FIG. 12 is observed along an X direction shown in FIG. 12, and a diagram of a structure shown in FIG. 13 may be obtained.

Similar to the antenna system 100 shown in FIG. 4 and FIG. 5, the antenna system 100 shown in FIG. 12 and FIG. 13 may include an antenna apparatus 10a. The antenna apparatus 10a may include a radiating element array 131 and a reflection plate 121. The radiating element array 131 is disposed on the reflection plate 121. The reflection plate 121 includes a plurality of reflection plate through holes 141. The antenna system 100 may further include a blade 150. The blade 150 is located on one side of the antenna apparatus 10a, and is disposed opposite to the plurality of reflection plate through holes 141.

In the embodiments shown in FIG. 12 and FIG. 13, the antenna apparatus 10a may further include a radiating element array 132. In some embodiments, as shown in FIG. 13, the radiating element array 131 and the radiating element array 132 may be disposed on a first side of the reflection plate 121, and the blade 150 is located on a second side of the reflection plate 121. For example, the radiating element array 131 and the blade 150 may be respectively located on the two sides of the reflection plate 121, and the radiating element array 131 and the radiating element array 132 are located on a same side of the reflection plate 121. In another embodiment, the radiating element array 131 and the radiating element array 132 may be disposed on the two sides of the reflection plate 121. For example, the radiating element array 131 and the blade 150 may be located on the first side of the reflection plate 121, and the radiating element array 132 is located on the second side of the reflection plate 121; or the radiating element array 132 and the blade 150 may be located on the first side of the reflection plate 121, and the radiating element array 131 is located on the second side of the reflection plate 121.

Figure 14:
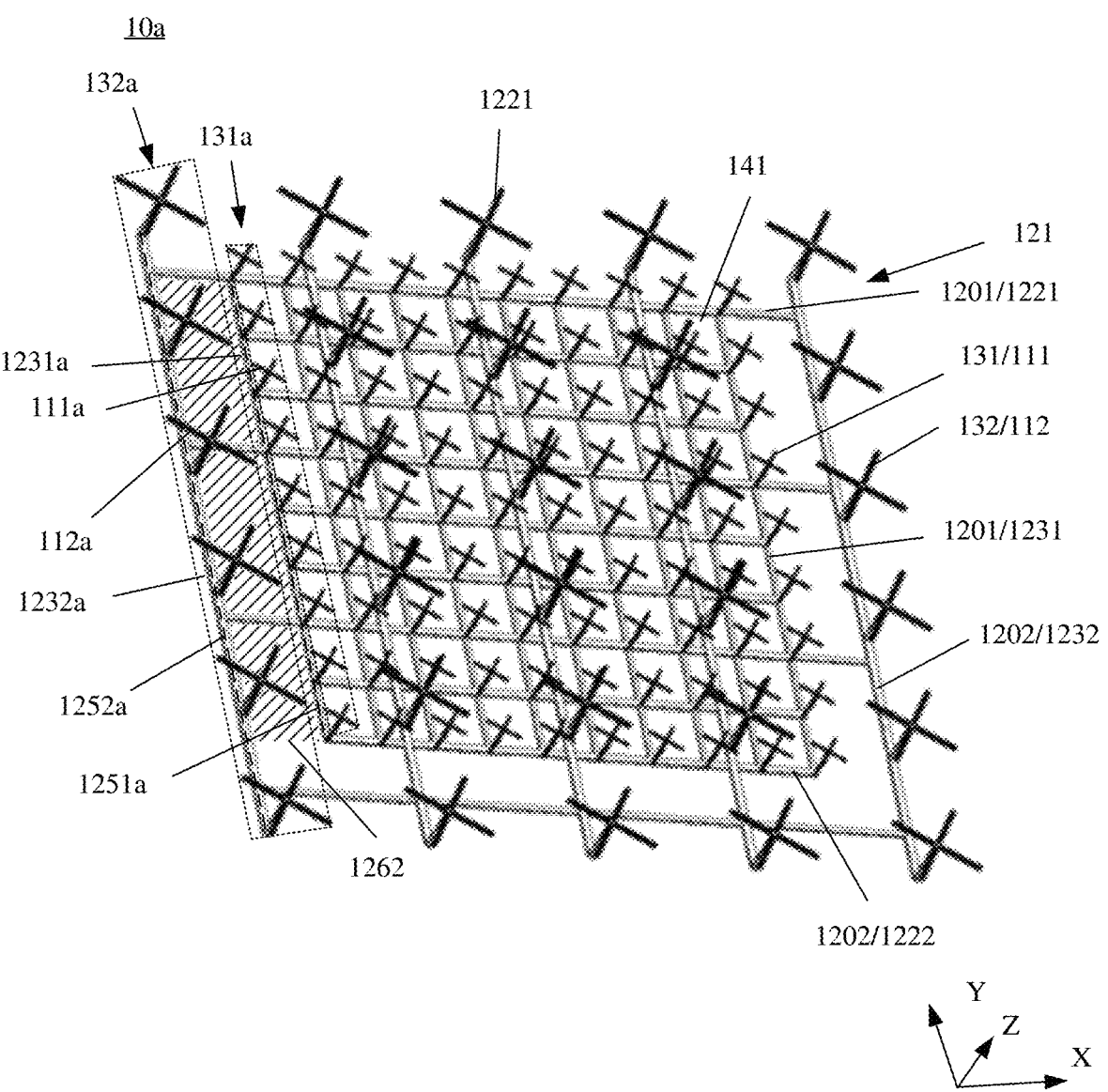
FIG. 14 is another diagram of a structure of an antenna apparatus according to an embodiment.

FIG. 14 is a diagram of a structure of an antenna apparatus 10a according to an embodiment. The following uses the embodiment shown in FIG. 14 as an example for description. It should be understood that embodiments provided herein are not limited to a specific quantity, a specific placement manner, and the like shown in FIG. 14.

A reflection plate 121 may include a reflection strip 1201 and a reflection strip 1202. A radiating element array 131 may include a plurality of radiating elements 111, and the plurality of radiating elements 111 may be disposed on the reflection strip 1201. A radiating element array 132 may include a plurality of radiating elements 112, and the plurality of radiating elements 112 may be disposed on the reflection strip 1202. A spacing between two adjacent radiating elements 111 may be a spacing a. A spacing between two adjacent radiating elements 112 may be a spacing b. The spacing a and the spacing b may be the same or different. A working frequency of the radiating element array 131 may be the same as or different from a working frequency of the radiating element array 132. A maximum radiation direction of the radiating element array 132 may be the same as or different from a maximum radiation direction of the radiating element array 131.

For a specific manner in which the radiating element array 131 and the radiating element array 132 are disposed on the reflection plate 121, refer to the embodiment shown in FIG. 8.

The following uses FIG. 14 as an example to describe an embodiment of the antenna apparatus 10a.

The reflection plate 121 may include nine reflection row strips 1221, 10 reflection column strips 1231, four reflection row strips 1222, and five reflection column strips 1232. The nine reflection row strips 1221 may be arranged at an equal spacing. The four reflection row strips 1222 may be arranged at an equal spacing. A spacing between two adjacent reflection row strips 1221 may be different from a spacing between two adjacent reflection row strips 1222. The 10 reflection column strips 1231 may be arranged at an equal spacing. The five reflection column strips 1232 may be arranged at an equal spacing. A spacing between two adjacent reflection column strips 1231 may be different from a spacing between two adjacent reflection column strips 1232.

It is assumed that a radiating element array 131a and a radiating element array 132a are disposed on the reflection plate 121. The radiating element array 131a includes nine radiating elements 111a. The nine radiating elements 111a are disposed on a reflection column strip 1231a of the reflection plate 121 at an equal spacing. The radiating element array 132a includes six radiating elements 112a. The six radiating elements 112a are disposed on a reflection column strip 1232a of the reflection plate 121 at an equal spacing. The nine radiating elements 111a may be arranged in one column and nine rows. The six radiating elements 112a may be arranged in one column and six rows. A length of the reflection column strip 1232a may be different from a length of the reflection column strip 1231a. A spacing between two adjacent radiating elements 111a may be different from a spacing between two adjacent radiating elements 112a. A working frequency of the radiating element array 131a may be different from a working frequency of the radiating element array 132a.

The radiating element array 131a may be fed by a feeder 1251a. The radiating element array 132a may be fed by a feeder 1252a. There is interval space 1262 (as shown in a slashed region in FIG. 14) between the feeder 1251a and the feeder 1252a. Among a plurality of reflection plate through holes 141 on the reflection plate 121, two reflection plate through holes 141a may be projected in the interval space 1262. A projection of the feeder 1251a on the reflection plate 121 may be located on the reflection column strip 1231a. A projection of the feeder 1252a on the reflection plate 121 may be located on the reflection column strip 1232a.

In other possible cases, the radiating element array 131a and the radiating element array 132a may alternatively be disposed on the reflection row strip 1222 of the reflection plate 121. The embodiment in which the radiating element array is disposed on the reflection row strip 1221 of the reflection plate 121 may be similar to the embodiment in which the radiating element array is disposed on the reflection column strip 1231 of the reflection plate 121. A person skilled in the art may refer to the embodiment shown in FIG. 14, to dispose the radiating element array 131a and the radiating element array 132a on the reflection row strip 1221 of the reflection plate 121.

Figure 15:
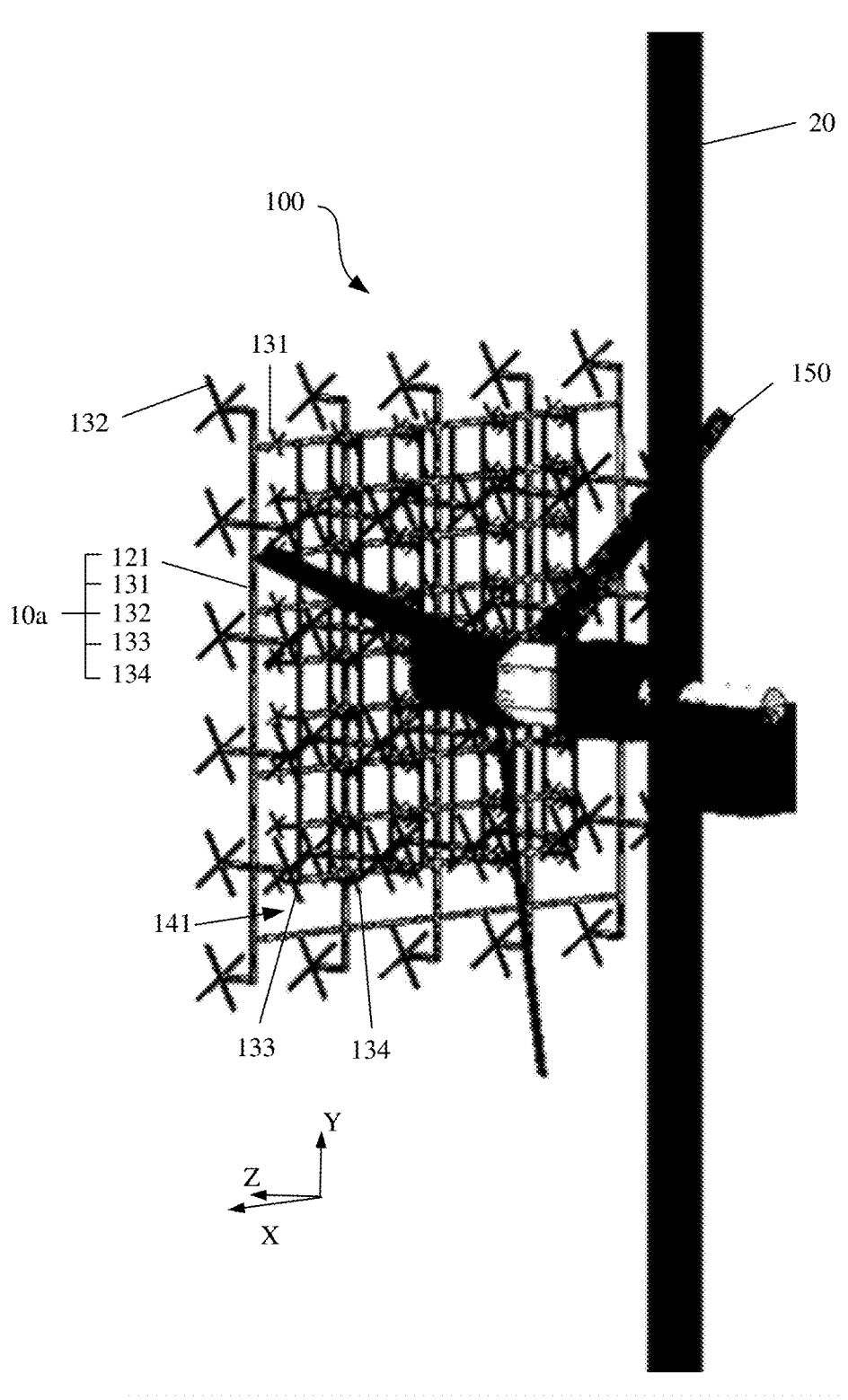
FIG. 15 is still another diagram of a structure of an antenna system according to an embodiment.

FIG. 15 is still another diagram of a structure of an antenna system 100 according to an embodiment.

Similar to the antenna system 100 shown in FIG. 12 and FIG. 13, the antenna system 100 shown in FIG. 15 may include an antenna apparatus 10a. The antenna apparatus 10a may include a radiating element array 131, a radiating element array 132, and a reflection plate 121. The radiating element array 131 and the radiating element array 132 may be disposed on a first side of the reflection plate 121. The reflection plate 121 may include a plurality of reflection plate through holes 141. The antenna system 100 may further include a blade 150. The blade 150 is located on one side of the antenna apparatus 10*a*, and is disposed opposite to the plurality of reflection plate through holes 141.

Figure 16:
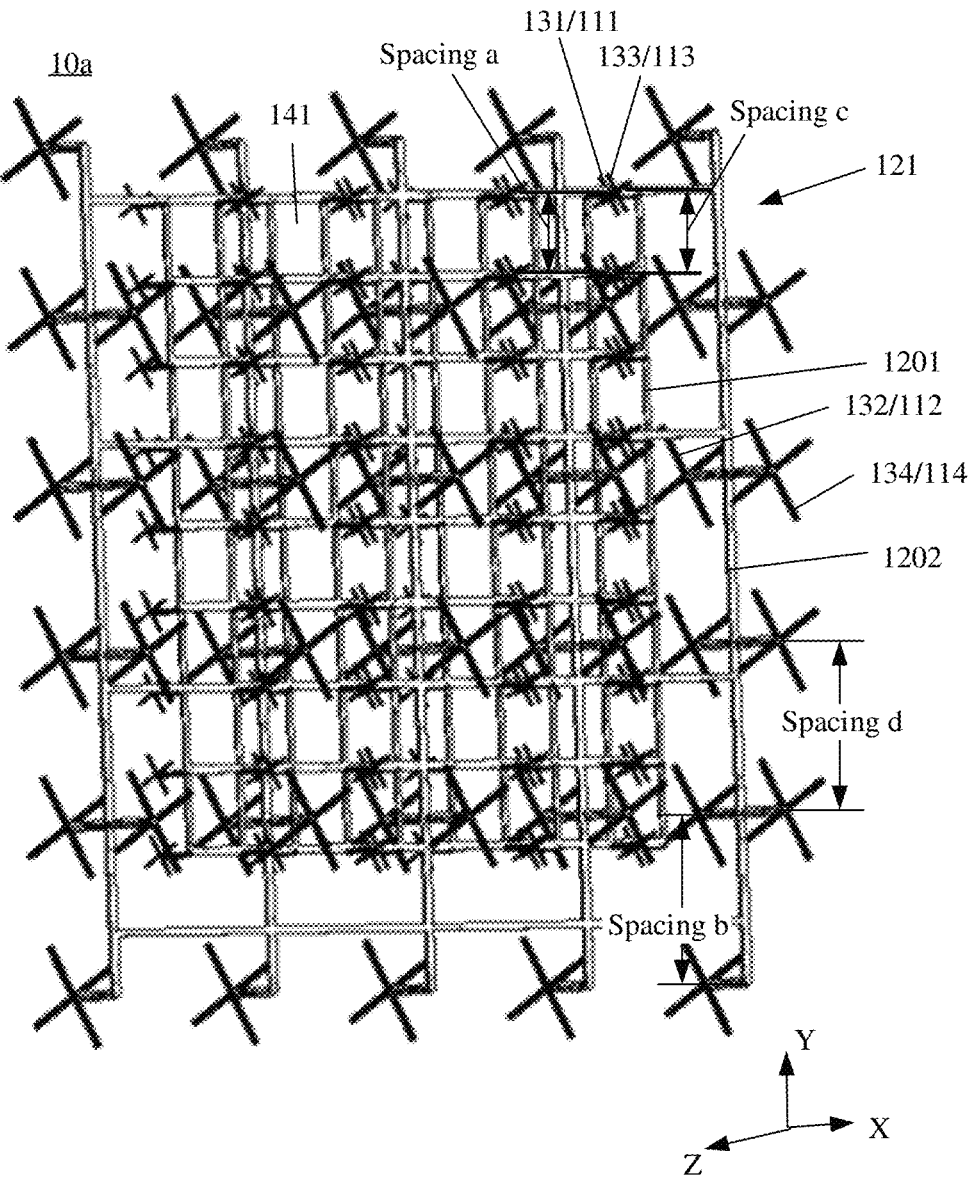
FIG. 16 is still another diagram of a structure of an antenna apparatus according to an embodiment.
Figure 17:
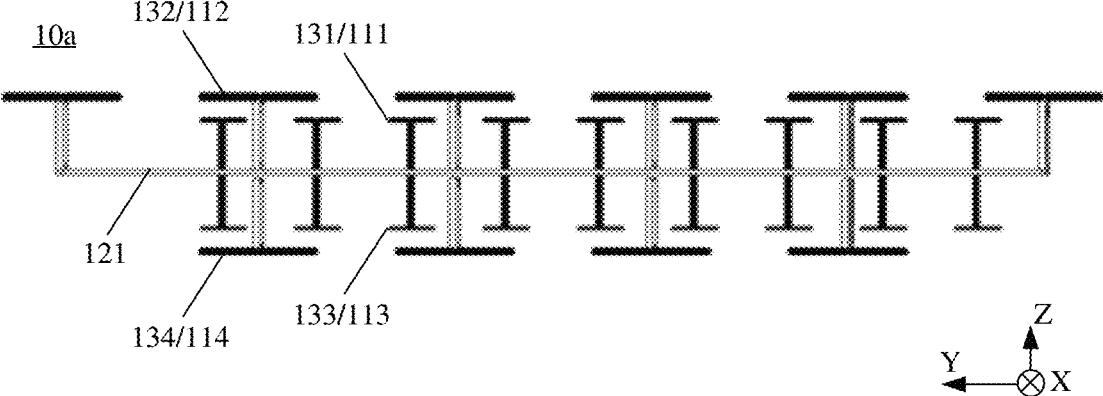
FIG. 17 is still another diagram of a structure of an antenna apparatus according to an embodiment.

FIG. 16 and FIG. 17 are diagrams of structures of an antenna apparatus 10*a* according to embodiments. In the embodiments shown in FIG. 15 to FIG. 17, the antenna apparatus 10*a* may further include a radiating element array 133 and a radiating element array 134. The radiating element array 133 and the radiating element array 134 may be disposed on a second side of the reflection plate 121. That is, the radiating element array 133 and the radiating element array 134 may be located on a same side of the reflection plate 121 as the blade 150.

The following uses the embodiments shown in FIG. 16 and FIG. 17 as an example for description. It should be understood that embodiments are not limited to a specific quantity and a specific placement manner shown in FIG. 16 and FIG. 17.

The reflection plate 121 may include a reflection strip 1201 and a reflection strip 1202. The radiating element array 131 may include a plurality of radiating elements 111, and the plurality of radiating elements 111 may be disposed on a first side of the reflection strip 1201. The radiating element array 132 may include a plurality of radiating elements 112, and the plurality of radiating elements 112 may be disposed on a first side of the reflection strip 1202. The radiating element array 133 may include a plurality of radiating elements 113, and the plurality of radiating elements 113 may be disposed on a second side of the reflection strip 1201. The radiating element array 134 may include a plurality of radiating elements 114, and the plurality of radiating elements 114 may be disposed on a second side of the reflection strip 1202.

The first side of the reflection strip 1201 may be opposite to the second side of the reflection strip 1201. In an embodiment, the first side of the reflection strip 1201 may correspond to the first side of the reflection plate 121, and the second side of the reflection strip 1201 may correspond to a second side of the reflection plate 121. In another embodiment, the first side of the reflection strip 1201 may correspond to the second side of the reflection plate 121, and the second side of the reflection strip 1201 may correspond to the first side of the reflection plate 121.

The first side of the reflection strip 1202 may be opposite to the second side of the reflection strip 1202. In an embodiment, the first side of the reflection strip 1202 may correspond to the first side of the reflection plate 121, and the second side of the reflection strip 1202 may correspond to the second side of the reflection plate 121. In another embodiment, the first side of the reflection strip 1202 may correspond to the second side of the reflection plate 121, and the second side of the reflection strip 1202 may correspond to the first side of the reflection plate 121.

A spacing between two adjacent radiating elements 111 may be a spacing a. A spacing between two adjacent radiating elements 112 may be a spacing b. A spacing between two adjacent radiating elements 113 may be a spacing c. A spacing between two adjacent radiating elements 114 may be a spacing d. The spacing a and the spacing b may be the same or different. The spacing a and the spacing c may be the same. The spacing b and the spacing d may be the same. A maximum radiation direction of the radiating element array 132 may be the same as or different from a maximum radiation direction of the radiating element array 131. A maximum radiation direction of the radiating element array 133 may be the same as or different from a maximum radiation direction of the radiating element array 134. A working frequency of the radiating element array 131 may be the same as or different from a working frequency of the radiating element array 132. A working frequency of the radiating element array 131 may be the same as or different from a working frequency of the radiating element array 133. A working frequency of the radiating element array 132 may be the same as or different from a working frequency of the radiating element array 134. For a specific manner in which the radiating element array 133 and the radiating element array 134 are disposed on the reflection plate 121, refer to the embodiment shown in FIG. 8 or FIG. 14.

In the embodiment shown in FIG. 17, K1 radiating element arrays 131, K2 radiating element arrays 132, K3 radiating element arrays 133, and K4 radiating element arrays 134 may be disposed in the antenna apparatus 10*a*. K1 may be equal to K3, and K2 may not be equal to K4. In another embodiment, K1 may not be equal to K3, and/or K2 may be equal to K4. That is, a specific quantity of radiating element arrays may be flexibly set.

Figure 18:
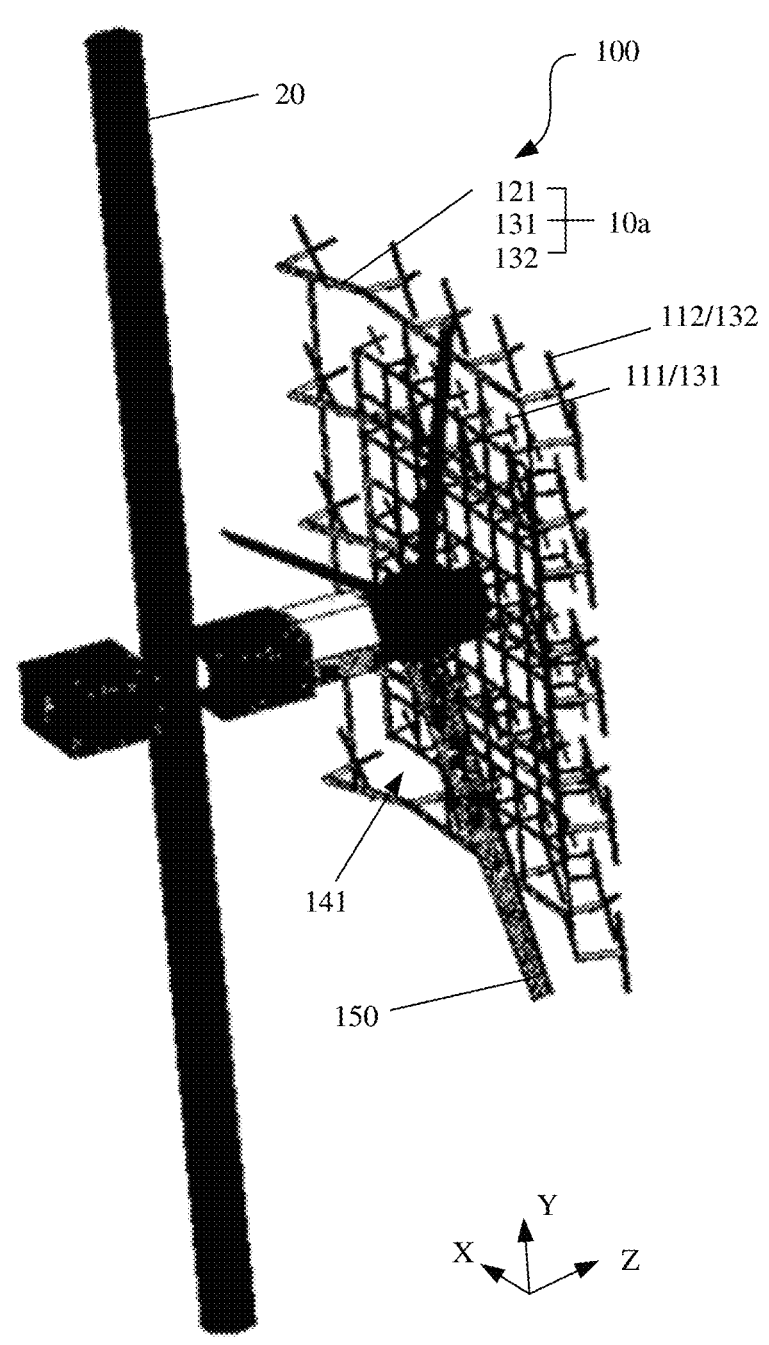
FIG. 18 is yet another diagram of a structure of an antenna system according to an embodiment.
Figure 19:
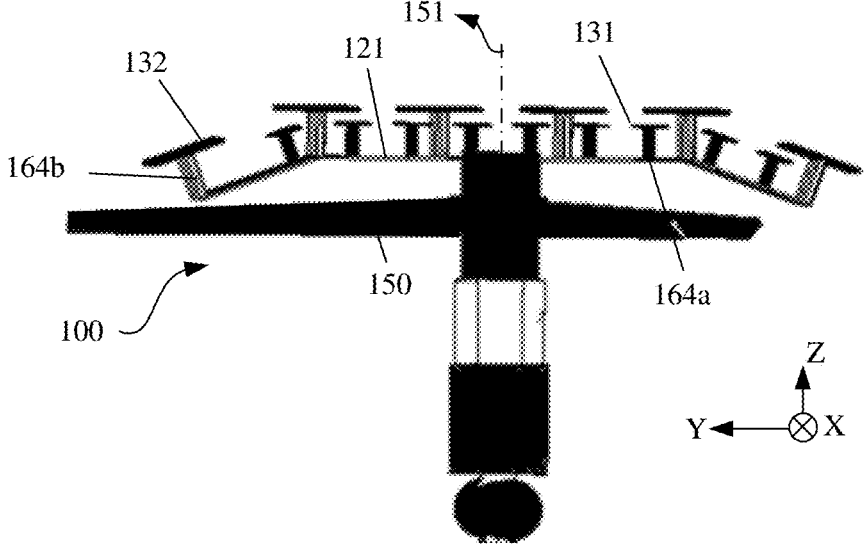
FIG. 19 is yet another diagram of a structure of an antenna system according to an embodiment.

FIG. 18 and FIG. 19 are yet other diagrams of structures of an antenna system 100 according to embodiments.

Similar to the antenna system 100 shown in FIG. 12 and FIG. 13, the antenna system 100 shown in FIG. 18 and FIG. 19 may include an antenna apparatus 10*a*. The antenna apparatus 10*a* may include a radiating element array 131, a radiating element array 132, and a reflection plate 121. The radiating element array 131 and the radiating element array 132 may be disposed on the reflection plate 121. The reflection plate 121 may include a plurality of reflection plate through holes 141. The antenna system 100 may further include a blade 150. The blade 150 is located on one side of the antenna apparatus 10*a*, and is disposed opposite to the plurality of reflection plate through holes 141.

In the embodiments shown in FIG. 18 and FIG. 19, the radiating element array 131 may include a plurality of radiating elements 111, and the radiating element array 132 may include a plurality of radiating elements 112. A spacing between two adjacent radiating elements 111 may be the same as or different from a spacing between two adjacent radiating elements 112. A working frequency of the radiating element array 131 may be the same as or different from a working frequency of the radiating element array 132. A maximum radiation direction of the radiating element array 131 may be different from a maximum radiation direction of the radiating element array 132. For example, the maximum radiation direction of the radiating element array 131 may be parallel to a direction of a rotation axis 151 of the blade 150, and the maximum radiation direction of the radiating element array 132 may be inclined to the direction of the rotation axis 151 of the blade 150. During specific implementation, as shown in FIG. 19, the radiating element array 131 may be fastened to the reflection plate 121 by using a support structure 164*a*, and an extension direction of the support structure 164*a* may be parallel to the rotation axis of the blade 150. The radiating element array 132 may be fastened to the reflection plate 121 by using a support structure 164*b*, and an extension direction of the support structure 164*b* may be inclined to the rotation axis of the blade 150.

Figure 20:
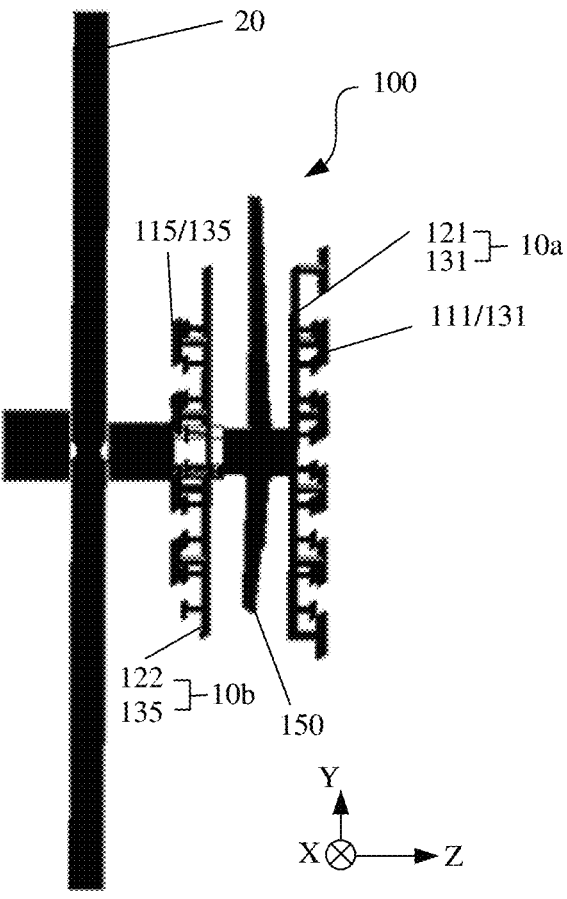
FIG. 20 is still yet another diagram of a structure of an antenna system according to an embodiment.

FIG. 20 is still yet another diagram of a structure of an antenna system 100 according to an embodiment.

Similar to the antenna system 100 shown in FIG. 4 and FIG. 5, the antenna system 100 shown in FIG. 20 may include an antenna apparatus 10*a*. The antenna apparatus 10*a* may include a radiating element array 131 and a reflection plate 121. The radiating element array 131 is disposed on the reflection plate 121. The reflection plate 121 includes a plurality of reflection plate through holes 141. The antenna system 100 may further include a blade 150. The blade 150 is located on one side of the antenna apparatus 10*a*, and is disposed opposite to the plurality of reflection plate through holes 141.

In the embodiment shown in FIG. 20, the antenna system 100 may further include an antenna apparatus 10*b*. The antenna apparatus 10*b* may include a radiating element array 135 and a reflection plate 122. The radiating element array 135 is disposed on a first side of the reflection plate 122. The reflection plate 122 includes a plurality of reflection plate through holes 142. The reflection plate 122 further has a second side opposite to the first side of the reflection plate 122. The blade 150 is located between the antenna apparatus 10*a* and the antenna apparatus 10*b*, and is disposed opposite to the plurality of reflection plate through holes 142. The first side of the reflection plate 122 and the second side of the reflection plate 122 are connected through the plurality of reflection plate through holes 142. That is, the antenna apparatus 10*b* may be located on one side that is of the blade 150 and that is away from the antenna apparatus 10*a*. In some embodiments, projections of the plurality of reflection plate through holes 142 on the reflection plate 121 may at least partially overlap the plurality of reflection plate through holes 141. For example, the plurality of reflection plate through holes 142 may be disposed opposite to the plurality of reflection plate through holes 141.

In some embodiments, as shown in FIG. 20, the radiating element array 135 may be located on one side that is of the reflection plate 122 and that is away from the blade 150. In other embodiments, the radiating element array 135 may be located on one side that is of the reflection plate 122 and that is close to the blade 150.

The radiating element array 131 may include a plurality of radiating elements 111, and the radiating element array 135 may include a plurality of radiating elements 115. A spacing between two adjacent radiating elements 111 may be a spacing a. A spacing between two adjacent radiating elements 115 may be a spacing c. The spacing a and the spacing e may be the same or different. A working frequency of the radiating element array 131 may be the same as or different from a working frequency of the radiating element array 135. A maximum radiation direction of the radiating element array 135 may be the same as or different from a maximum radiation direction of the radiating element array 131.

Figure 21:
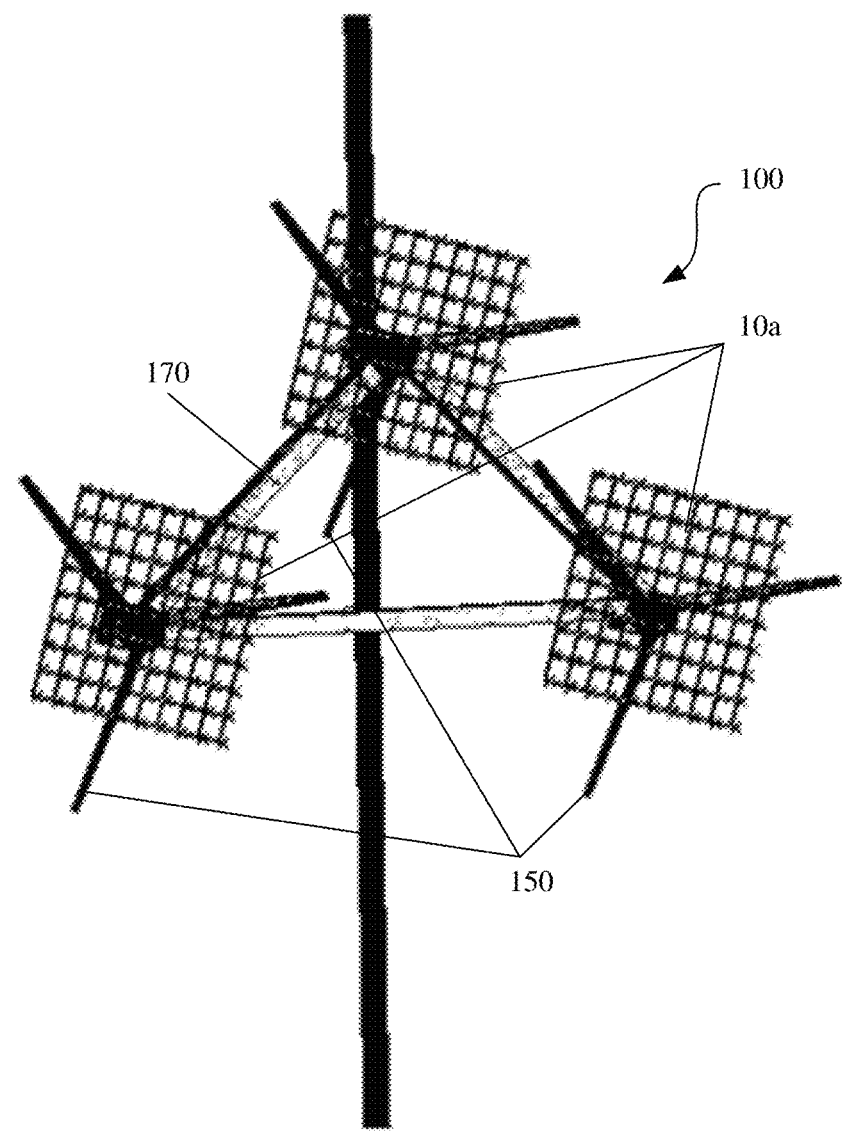
FIG. 21 is still yet another diagram of a structure of an antenna system according to an embodiment.

FIG. 21 is still yet another diagram of a structure of an antenna system 100 according to an embodiment.

The antenna system 100 shown in FIG. 21 may include a plurality of antenna apparatuses 10*a* shown in FIG. 4 and FIG. 5. The plurality of antenna apparatuses 10*a* may be integrated on a pole 20, so that the antenna system 100 may receive and send a signal through the plurality of antenna apparatuses 10*a*, to improve signal communication quality. With reference to FIG. 4 and FIG. 21, each antenna apparatus 10*a* may include a radiating element array 131 and a reflection plate 121. The radiating element array 131 is disposed on the reflection plate 121. The reflection plate 121 includes a plurality of reflection plate through holes 141. The antenna system 100 may further include a plurality of blades 150 disposed opposite to the antenna apparatuses 10*a*. The plurality of blades 150 are in one-to-one correspondence with the plurality of antenna apparatuses 10*a*. Each blade 150 is located on one side of a corresponding antenna apparatus 10*a*, and is disposed opposite to a corresponding plurality of reflection plate through holes 141.

Rotation of the plurality of blades 150 may not interfere with each other. In some embodiments, rotation axes 151 of the plurality of blades 150 may be parallel to each other. Projection regions of the plurality of antenna apparatuses 10*a* may not cross each other along a direction of the rotation axis 151 of the blade 150.

The plurality of antenna apparatuses 10*a* may be connected and fastened by using a mechanical part. For example, the antenna system 100 shown in FIG. 21 may include three antenna apparatuses 10*a*. The three antenna apparatuses 10*a* are connected through three connecting rods 170, to form a triangular structure having high stability. Space enclosed by the triangular structure may be through, helping reduce acting force of airflow on the antenna system 100.

Embodiments further provide a communication device. The communication device may include the antenna system 100 in any embodiment shown in FIG. 4 to FIG. 21. In some embodiments, the communication device may further include a signal processing apparatus. The signal processing apparatus may receive and/or send a signal through the antenna system 100, and has a signal processing capability. For example, the signal processing apparatus may include the radio frequency processing unit 50 and the baseband processing unit 60 shown in FIG. 2.

Figure 22:
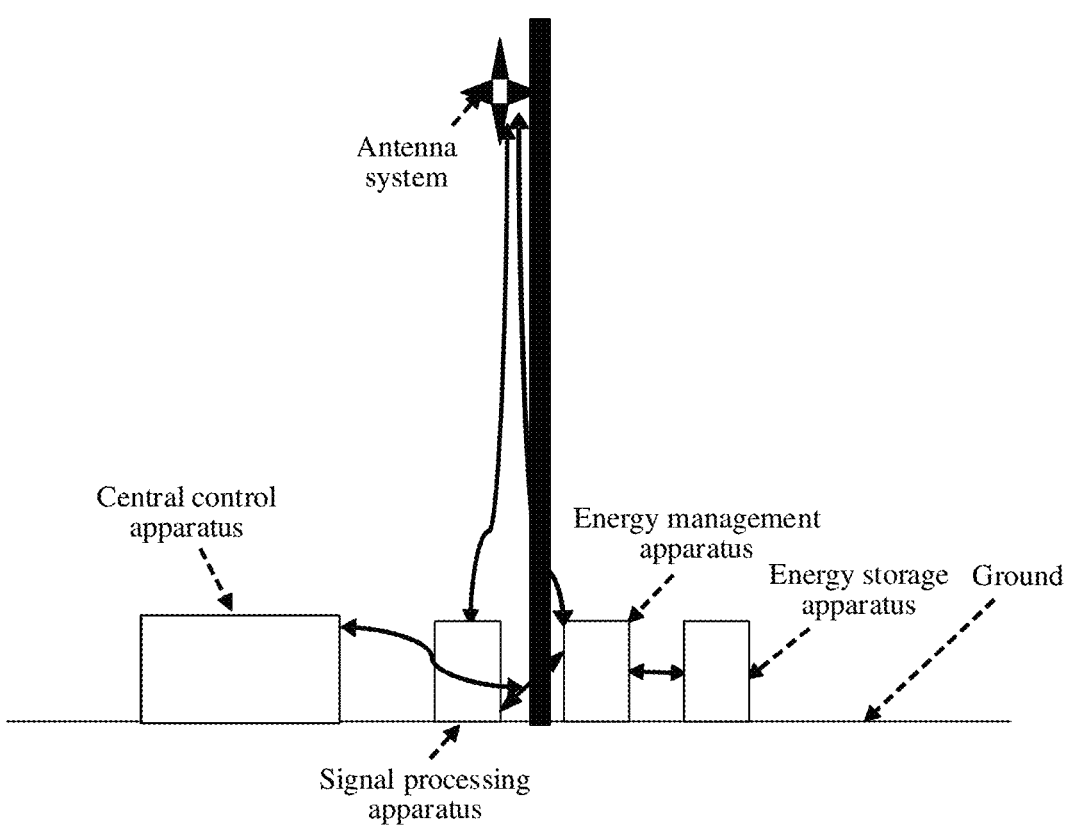
FIG. 22 is a diagram of a structure of a communication system according to an embodiment.
Figure 23:
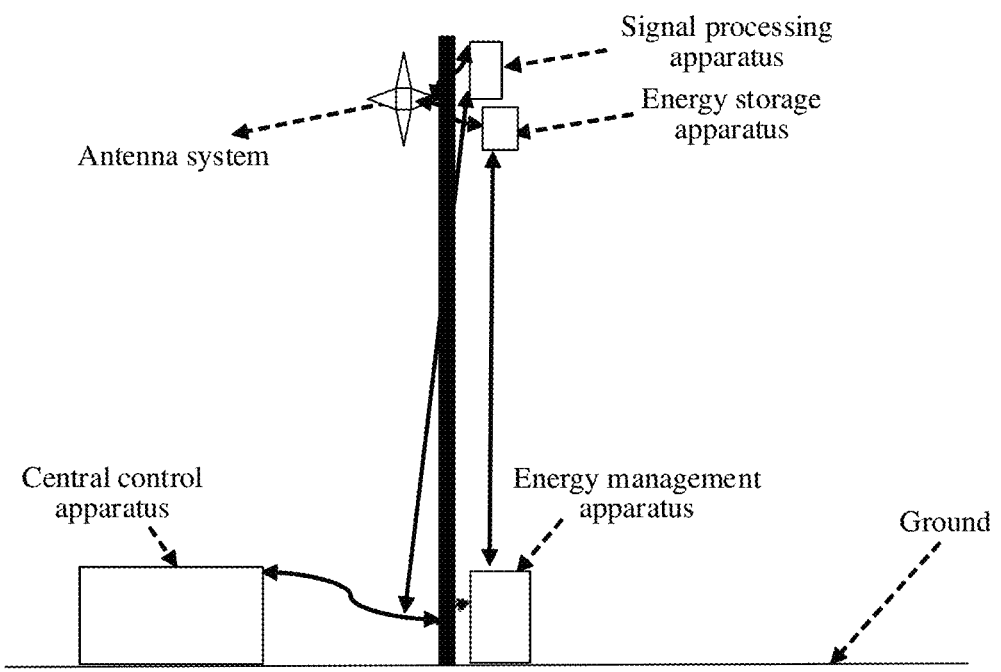
FIG. 23 is another diagram of a structure of a communication system according to an embodiment.

FIG. 22 and FIG. 23 show a communication system according to the embodiments. The communication system may include a signal processing apparatus and the antenna system 100 in any embodiment shown in FIG. 4 to FIG. 21.

In some embodiments provided, the communication system may further include a central control apparatus and an energy management apparatus. The central control apparatus may be configured to comprehensively manage the communication device and the energy management apparatus. The energy management apparatus may be configured to output, to another apparatus of the communication system, energy generated by rotation of a blade 150 under an action of wind force, for example, output the energy to an antenna apparatus 10 of the antenna system 100. For example, mechanical energy generated by the rotation of the blade 150 may be converted into electric energy by the generator 180.

In some embodiments provided, the communication system may further include an energy storage apparatus. The energy storage apparatus may be configured to store the energy generated by the rotation of the blade under the action of the wind force. For example, the mechanical energy generated by the rotation of the blade 150 may be converted into the electric energy by the generator, and the energy storage apparatus may be connected to the generator, so that the energy storage apparatus can store the electric energy generated by the generator.

In the embodiment shown in FIG. 22, another module of the communication device except the antenna system 100, the central control apparatus, the energy management apparatus, the energy storage apparatus, and the like may be disposed on the ground. In another embodiment, a part of the another module of the communication device except the antenna system 100, the central control apparatus, the energy management apparatus, and the energy storage apparatus may be disposed on a pole, and the other part may be disposed on the ground. For example, as shown in FIG. 23, the another module of the communication device except the antenna system 100 and the energy storage apparatus may be disposed on the pole and disposed close to the antenna system 100, and the central control apparatus and the energy management apparatus may be disposed on the ground.

A device, an apparatus, or the like is disposed on the pole, to help reduce a signal transmission path. The device, apparatus, or the like is disposed on the ground, to help reduce a loading weight of the pole and help improve use stability of the communication system.

The embodiments provide the antenna system, the communication device, and the communication system. The blade is disposed near the antenna apparatus, the antenna apparatus has the reflection plate with a hollowed-out design, and the blade is rotatable under the action of the wind force. This helps weaken acting force of wind load on the antenna apparatus, so that the antenna apparatus can still work normally in a harsh wind environment. Therefore, this helps improve use performance of the antenna apparatus.

In addition, embodiments may be combined and referenced with each other.

The foregoing descriptions are merely specific implementations of the embodiments, but are not intended to limit their scope. Any variation or replacement readily figured out by a person skilled in the art shall fall within the scope of the embodiments.

What is claimed is:

1. An antenna system, comprising:
a first antenna apparatus, wherein the first antenna apparatus comprises a first radiating element array and a first reflection plate, the first radiating element array is disposed on a first side of the first reflection plate, the first reflection plate comprises a plurality of first reflection plate through holes, the first reflection plate further has a second side opposite to the first side, and the first side of the first reflection plate and the second side of the first reflection plate are connected through the plurality of first reflection plate through holes; and
a blade, wherein the blade is located on one side of the first antenna apparatus, and the blade is disposed opposite to the plurality of first reflection plate through holes;
wherein the first antenna apparatus further comprises:
a first feeder, wherein the first feeder is disposed on the first reflection plate, and the first feeder is configured to feed the first radiating element array; and
a second radiating element array; and
a second feeder, wherein the second feeder is disposed on the first reflection plate, and the second feeder is configured to feed the second radiating element array, wherein the first radiating element array is adjacent to the second radiating element array, a first interval space exists between the second feeder and the first feeder, and a projection of at least a part of the plurality of first reflection plate through holes is located in the first interval space.

2. The antenna system according to claim 1, further comprising:
a generator configured to collect energy generated by rotation of the blade.

3. The antenna system according to claim 2, further comprising:
an energy storage apparatus configured to store electric energy generated by the generator.

4. The antenna system according to claim 1, wherein the first reflection plate comprises M reflection row strips and N reflection column strips, the M reflection row strips and the N reflection column strips cross each other to form the plurality of first reflection plate through holes, and M and N are integers greater than 2; and projections of the first feeder and the second feeder on the first reflection plate are located on two adjacent reflection row strips in the M reflection row strips; or projections of the first feeder and the second feeder on the first reflection plate are located on two adjacent reflection column strips in the N reflection column strips.

5. The antenna system according to claim 1, wherein a maximum radiation direction of the first radiating element array is different from a maximum radiation direction of the second radiating element array.

6. The antenna system according to claim 5, wherein the maximum radiation direction of the first radiating element array is the same as a direction of a rotation axis of the blade.

7. The antenna system according to claim 1, wherein the second feeder and the first feeder are located on a same side of the first reflection plate.

8. The antenna system according to claim 1, further comprising:
a second antenna apparatus, wherein the second antenna apparatus comprises a third radiating element array and a second reflection plate, the third radiating element array is disposed on a first side of the second reflection plate, the second reflection plate comprises a plurality of second reflection plate through holes, the plurality of second reflection plate through holes is disposed opposite to the blade, the second reflection plate further has a second side opposite to the first side of the second reflection plate, the first side of the second reflection plate and the second side of the second reflection plate are connected through the plurality of second reflection plate through holes, and the second antenna apparatus is located on one side of the blade that is away from the first antenna apparatus.

9. The antenna system according to claim 8, wherein the third radiating element array is located on one side of the second reflection plate that is away from the blade.

10. The antenna system according to claim 8, wherein projections of the plurality of second reflection plate through holes on the first reflection plate at least partially overlap the plurality of first reflection plate through holes.

11. The antenna system according to claim 8, wherein a maximum radiation direction of the third radiating element array is different from the maximum radiation direction of the first radiating element array.

12. The antenna system according to claim 1, further comprising:
a fastening apparatus, wherein the fastening apparatus comprises a stator and a rotor, the stator is fastened to the first antenna apparatus, the rotor is connected to the blade, and the rotor is rotatable relative to the stator.

13. The antenna system according to claim 12, further comprising:
a signal cable of the first radiating element array, wherein the signal cable is accommodated in a hollow cavity of the stator.

14. An antenna system in a communication device, the antenna system comprising:
a first antenna apparatus, wherein the first antenna apparatus comprises a first radiating element array and a first reflection plate, the first radiating element array is disposed on a first side of the first reflection plate, the first reflection plate comprises a plurality of first reflection plate through holes, the first reflection plate further has a second side opposite to the first side, and the first side of the first reflection plate and the second side of the first reflection plate are connected through the plurality of first reflection plate through holes; and

a blade, wherein the blade is located on one side of the first antenna apparatus, and the blade is disposed opposite to the plurality of first reflection plate through holes;

wherein the first antenna apparatus further comprises:

a first feeder, wherein the first feeder is disposed on the first reflection plate, and the first feeder is configured to feed the first radiating element array; and a second radiating element array; and a second feeder, wherein the second feeder is disposed on the first reflection plate, and the second feeder is configured to feed the second radiating element array, wherein the first radiating element array is adjacent to the second radiating element array, a first interval space exists between the second feeder and the first feeder, and a projection of at least a part of the plurality of first reflection plate through holes is located in the first interval space.

15. The antenna system according to claim 14, further comprising:

a generator configured to collect energy generated by rotation of the blade.

16. The antenna system according to claim 15, further comprising:

an energy storage apparatus configured to store electric energy generated by the generator.

17. The antenna system according to claim 14, wherein the first reflection plate comprises M reflection row strips and N reflection column strips, the M reflection row strips and the N reflection column strips cross each other to form the plurality of first reflection plate through holes, and M and N are integers greater than 2; and projections of the first feeder and the second feeder on the first reflection plate are located on two adjacent reflection row strips in the M reflection row strips; or projections of the first feeder and the second feeder on the first reflection plate are located on two adjacent reflection column strips in the N reflection column strips.

18. The antenna system according to claim 14, wherein a maximum radiation direction of the first radiating element array is different from a maximum radiation direction of the second radiating element array.

* * * * *